United States Patent [19]
Gwin et al.

[11] 3,741,457

[45] June 26, 1973

[54] LINEUP CLAMP AND BACKUP DEVICE

[75] Inventors: Richard B. Gwin, Arlington; William L. Ballis, Hilliard; Claude W. Churchheus, Laurelville; Bruce L. Hutt, Valley View; Charles R. Chew, Chagrin Falls; Arthur M. Hall, Newton Falls, all of Ohio

[73] Assignee: Columbia Gas System Service Corporation, Wilmington, Del.

[22] Filed: Aug. 19, 1971

[21] Appl. No.: 173,157

[52] U.S. Cl. .................. 228/44, 29/200 P, 228/50, 269/48.1
[51] Int. Cl. .......................................... B23k 19/00
[58] Field of Search .................... 228/4, 5, 6, 44, 228/50; 29/200 P, 200 J, 237; 269/48.1, 52

[56] References Cited
UNITED STATES PATENTS

| | | | |
|---|---|---|---|
| 3,633,813 | 1/1972 | Looney | 219/60 X |
| 3,461,264 | 8/1969 | Nelson et al. | 228/44 |
| 3,259,964 | 7/1966 | Engel | 29/200 P |
| 2,830,551 | 4/1958 | Miller | 269/48.1 |
| 2,804,836 | 9/1957 | Tiedemann | 269/52 |

*Primary Examiner*—J. Spencer Overholser
*Assistant Examiner*—Robert J. Craig
*Attorney*—Curtis, Morris & Safford

[57] ABSTRACT

A pipe clamp for aligning and spacing a pair of pipes to be welded is disclosed wherein a housing, having first and second axially aligned housing sections with adjacent end positions positioned relative axial movement, is adapted for disposition within and coaxially of a pair of pipes to be welded, with the adjacent end portions of the housing sections located adjacent the inside of the joint between the adjacent ends of the pipe to be welded. A plurality of clamping chambers are slidably mounted in each of the housing sections for radial movement between extended and retracted positions and are moved between these positions by pneumatic drive means for selective engagement with the inner surface of the surrounding pipes. A pneumatic drive mechanism is operatively connected between the clamping members mounted on the first housing section and the second housing section for moving the first housing section and the clamping members thereon a predetermined distance with respect to the second housing section, after the clamping members are extended so that a pipe clampingly engaged with the clamping members on the first housing section is moved a predetermined distance with respect to a pipe clampingly engaged with the clamping members on the second housing section whereby the adjacent pipe ends are spaced that predetermined distance. The second housing section is also provided with a weld joint backup shoe assembly slidably mounted thereon for radial movement between extended and retracted positions and is located between the clamping members on the first and second housing sections. The backup shoe assembly is extended and retracted by pneumatic drive means into and out of position adjacent the joint between the pipes to be welded, after the pipes have been spaced, to provide backup support for molten weld metal during the welding operation.

55 Claims, 21 Drawing Figures

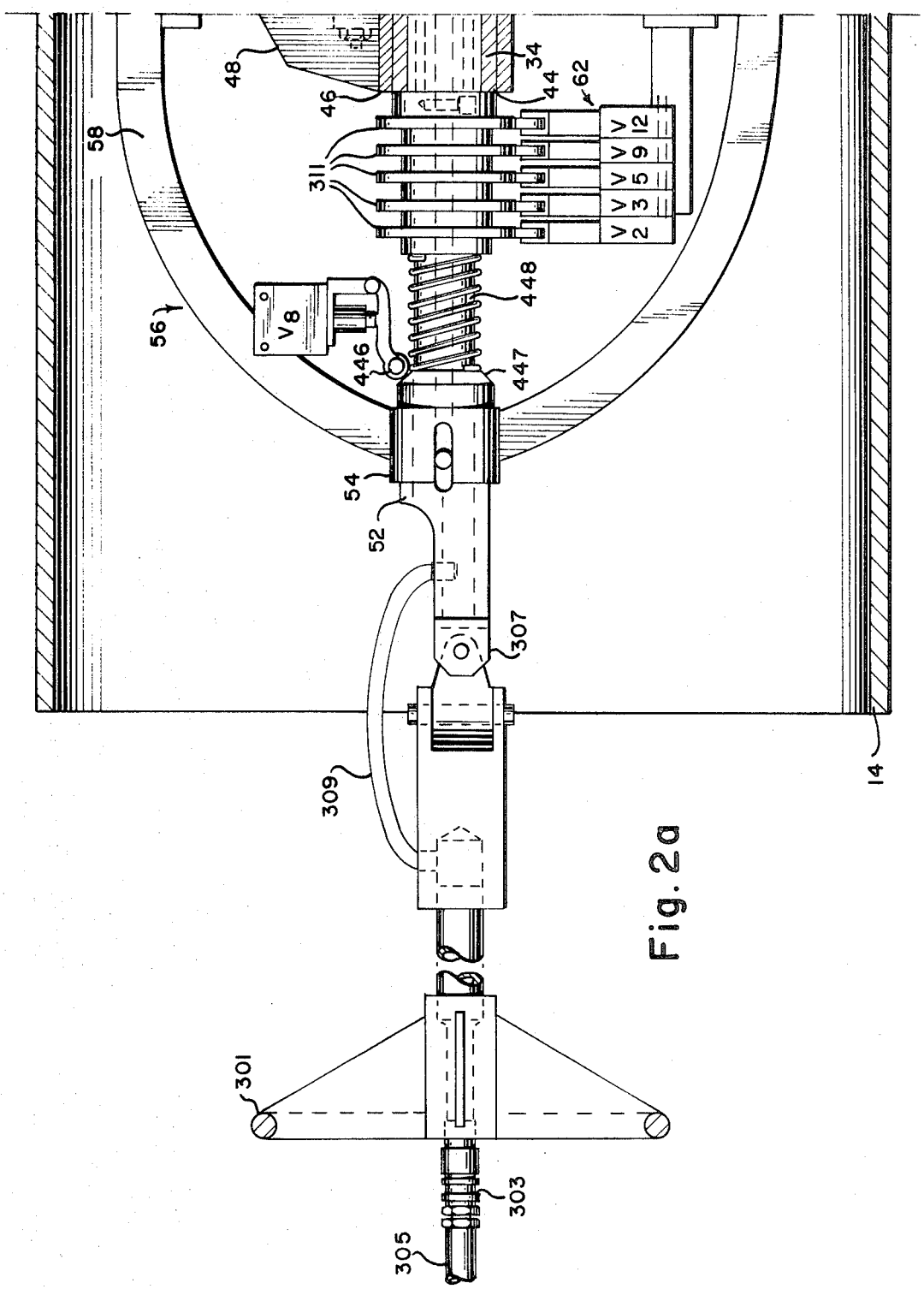

LINEUP CLAMP AND BACKUP DEVICE

This invention relates to pipeline welding apparatus and more particularly to apparatus for accurately aligning and equally spacing adjacent ends of pipeline sections while clamping such sections in position with respect to each other and providing backup support for weld metal to be introduced therebetween.

In pipeline construction, particularly in large diameter pipelines for oil and gas transmission, it has been found necessary to utilize auxiliary equipment such as internal alignment clamps for maintaining the adjacent ends of a pair of pipes to be welded in axial alignment during the welding operation. Typically, such clamps are positioned within the free end of the completed or "in place" portion of the pipeline and the next pipe to be welded is then "set in" about the clamp in abutting engagement with the in place pipe. The clamps are then extended to hold the pipes in abutting engagement. However, such previously proposed devices have not been fully satisfactory in use for a number of reasons. For example, it has been found that after the clamps are expanded, it is relatively impossible to adjust the relative positions of the pipeline ends to assure that these ends are in abutting engagement or, where required by the welding process utilized, accurately spaced from one another about their entire periphery. This spacing has, in the past, been done by "eyeballing" the space before expanding the clamps or by driving the wedges between the pipes after the clamps are expanded. These wedges may create discontinuities in the weld joint configuration prior to welding and may introduce foreign material into the joint. Moreover, the wedges are difficult to remove once the welding operation is begun. While both of the above spacing methods are being used, they are inaccurate and as a result unsatisfactory welds are produced.

In some welding operations, in addition to the clamping device, it is often necessary to provide a backup support for molten weld metal during the welding process. This is generally provided in the form of a chill ring expanded in the interior of the pipeline against the joint to be welded. In those previously proposed alignment devices which provide chill rings or backup assemblies, it has been found that there usually is a gap between the adjacent end portions of the backup rings which leaves spaced portions of the pipe joint open or not backed up during the welding process. As a result, the molten weld metal sags inwardly at the unprotected portion of the joint and the benefits of utilizing a backup shoe are lost since there are formed inwardly extending nodules of metal at these points or the hot welding torch burns completely through the metal of the pipe section and the exposed portions, thus resulting in a defective weld between the two pipe sections. While certain of the previously proposed backup shoe assemblies provide insert members for the gaps between backup shoe segments, such members generally do not align flush with the adjacent backupshoe segments so that the insert is spaced from the inner surface of the pipeline and a gap is still formed between shoe segments.

Accordingly, it is an object of the present invention to overcome the above problems in pipe clamping and spacing devices while providing a continuous weld joint chill ring.

Another object of the invention is to accurately align the adjacent ends of pipe sections to be welded and to space these ends a predetermined distance from one another to assure proper welding.

It is another object of the present invention to provide a continuous molten weld metal backup shoe assembly for the joint between two adjacent pipeline pipe sections.

It is yet another object of the present invention to provide a backup shoe for a circumferential joint to be welded in a pipeline to provide support for molten welding metal during the welding operation.

Yet another object of the present invention is to provide a welding clamp and lineup apparatus for weld backup and alignment of adjacent ends of pipe sections which is simple and efficient in operation and economical and durable in construction.

In accordance with an aspect of the present invention a pipe clamp for aligning and spacing a pair of pipes to be welded and for providing a backup for molten weld metal during the welding operation includes a housing having first and second sections operatively interconnected for relative axial movement therebetween and for disposition within and coaxially of the pipes to be welded with the point of operative interconnection between the housing sections adjacent the inside of the joint between adjacent ends of the pipes to be welded. An elongated central support member is mounted in the housing for supporting the clamping and weld joint backup shoe assemblies. The support member comprises an elongated tube with one end thereof mounted in the first housing section for selective sliding movement therebetween and the other end thereof rigidly mounted in the second housing section.

A first or inner torque tube is located in the housing and receives and is rotatably supported on the support tube. The inner tube includes first and second tube members operatively interconnected for relative longitudinal movement, with the first tube member being slidably mounted on the support member for relative longitudinal movement with respect thereto and the point of interconnection of the first and second tube members being located in substantial alignment with the point of operative interconnection of the housing sections.

A pair of second or outer torque tubes respectively receive and are rotatably mounted on the first and second inner torque tube members and these outer torque tubes are spaced from one another with the opposed ends thereof located respectively on opposite sides of the point of operative interconnection between first and second inner torque tube members. The outer torque tubes form part of the clamping mechanism of the device and a pair of annular radially extending cams are mounted respectively on the outer torque tubes adjacent the ends thereof for engagement with the clamping members. The latter are slidably mounted in the respective housing sections for radial movement between extended and retracted positions with respect thereto and are positioned in concentric alignment with their associated cams. The clamping members respectively include a cam follower and means for followers the cam follower in engagement with their associated cams. The cams have lobes on the peripheral surfaces thereof for extending the clamping members when the lobes are engaged with the cam followers. A plurality of pneumatic rams are provided for rotating the outer torque tubes separately and independently between first and second positions corresponding to the retracted and extended positions of the clamping members so that the cam lobes are in engagement with the cam followers at the second position of the outer torque tubes to extend the clamping members into engagement with the pipes located on opposite sides of the joint to be welded.

A third annular radially extending cam, of substantially different configuration than the clamping system cams, is mounted on the second tube member of the inner torque tube adjacent its point of operative interconnection with the first tube member. A weld joint backup shoe assembly is slidably mounted in the second housing section for radial movement with respect thereto between retracted and extended positions wherein a circular portion of the assembly is positioned adjacent the circumferential joint to be welded to backup and support molten weld metal during the welding operation.

The backup shoe assembly is positioned in concentric alignment with the cam mounted on the inner torque tube and the assembly includes a plurality of cam followers and means for maintaining the cam followers in engagement with their associated cam. This cam has a lobe on its periphery associated with each of the cam followers for moving the assembly to its extended position. A plurality of pneumatic rams are provided for rotating the inner torque tube between first and second positions corresponding respectively to retracted and extended positions of the backup shoe assembly whereby the lobes on the cam are moved into engagement with the cam followers of the backup shoe assembly in the second position of the inner torque tube to extend the backup shoe assembly against the joint.

The apparatus also includes pneumatic rams for moving the first housing section, and the outer torque tube along the second tube member, a predetermined distance with respect to the second housing section, prior to the extension of the backup shoe assembly, and after extension of the clamping members, whereby the adjacent ends of the pipe are spaced apart the predetermined distance.

The above, and other objects, features and advantages of this invention, will be apparent in the following detailed description of an illustrative embodiment thereof which is to be read in connection with the accompanying drawings, wherein:

FIGS. 2a-2e are respectively enlarged views, with parts broken away, of correspondingly legended sections of the apparatus of FIG. 1;

Figure 1:
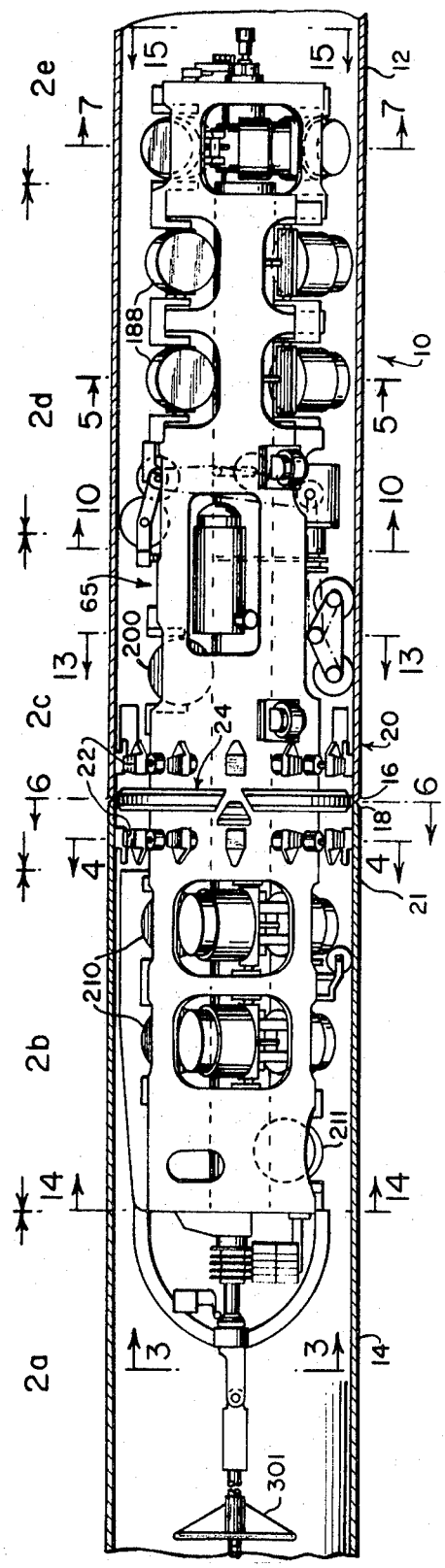
FIG. 1 is an elevational view of a pipe clamp constructed in accordance with the present invention located within a pipeline adjacent a joint to be welded.

Referring now to the drawings in detail, and initially to FIG. 1 thereof, it will be seen that a pipe alignment clamp and backup shoe assembly 10, as seen therein, is constructed for insertion in pipe sections 12 and 14 whose ends are to be welded together in a continuous pipeline.

Pipe section 12 constitutes the last or "in place" pipe of a pipeline whose free end portion 16 is to be welded to the free end 18 of the next pipe in the pipeline, i.e., the "set in" pipe 14. Clamp 10 of the present invention is constructed to fit within the interior of the pipes to be welded and extends substantially coaxially thereof. The clamp includes a pair of clamping systems 20 and 21, each of which comprises a set of clamp members 22 located in spaced relation to each other in order to engage respectively the inner surfaces of the pipelines 12 and 14, thereby to hold the pipes in juxtaposed spaced relation during the welding operation. A weld joint backup shoe assembly 24, which is constructed to be expanded against the interior surfaces of the pipe joint after the clamping members have firmly positioned the pipe sections in axial alingment, provides a backup support for the molten weld metal.

Figure 3:
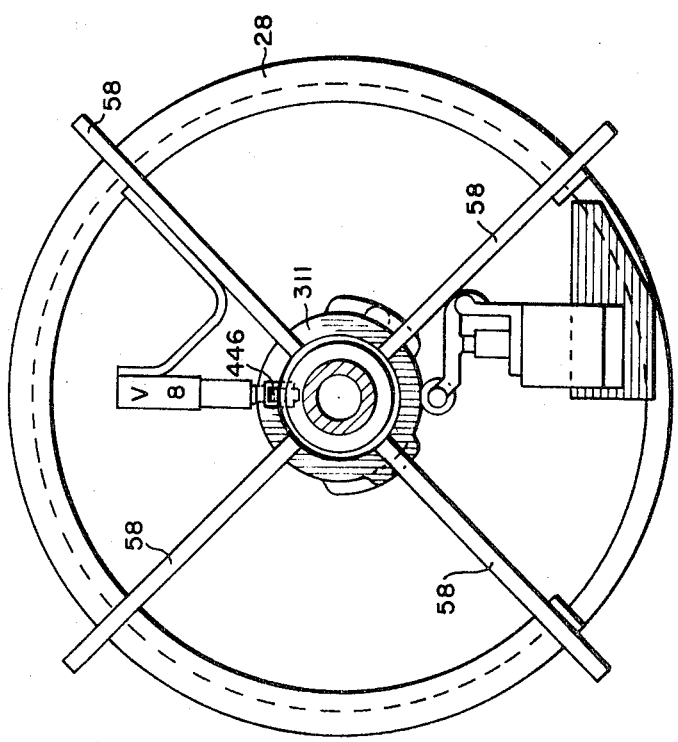
FIG. 3 is an end view of the apparatus illustrated in FIG. 1 taken on line 3—3 thereof.

A better understanding of the present invention can be achieved by reference to FIGS. 2a-2e wherein the entire apparatus is illustrated in an enlarged configuration with parts broken away to reveal the important structural features of the clamping and backup shoe assemblies. As seen therein (FIG. 2c), the clamp 10 is formed of two housing sections 26 and 28 which have complementarily shouldered edge portions 30 and 32 respectively which are positioned in overlapping relationship to permit sliding movement between the two housing sections. The latter are operatively interconnected for limited sliding movement with respect to each other by a central tubular support member 34 which is rigidly secured at one end 36 to the end 38 of housing section 26 (FIG. 2e) by an end closure disc or other similar radial support member 40 rigidly secured to the housing end 38. The other end 44 of tube 34 is rigidly mounted in a collar 46 secured to housing section 28 by a spider assembly of three arms 48 through a plurality of pistons 50, whose function is more fully described hereinafter. In addition, the end 44 of tube 34 is rotatably and slidably interconnected to a reach rod 52 at collar 46. Reach rod 52 is slidably supported in a collar 54 connected by a spider assembly 56, consisting of four arms 58 (FIG. 3), secured to housing section 28. Spider assembly 56 provides protection for the forward end 60 of the housing and the control valve system 62 mounted thereon. (Housing section 28 and the various equipment mounted thereon is also protected from engagement with pipe 14 by a plurality of radially extending vanes 63, only one of which is shown.)

Figure 16:
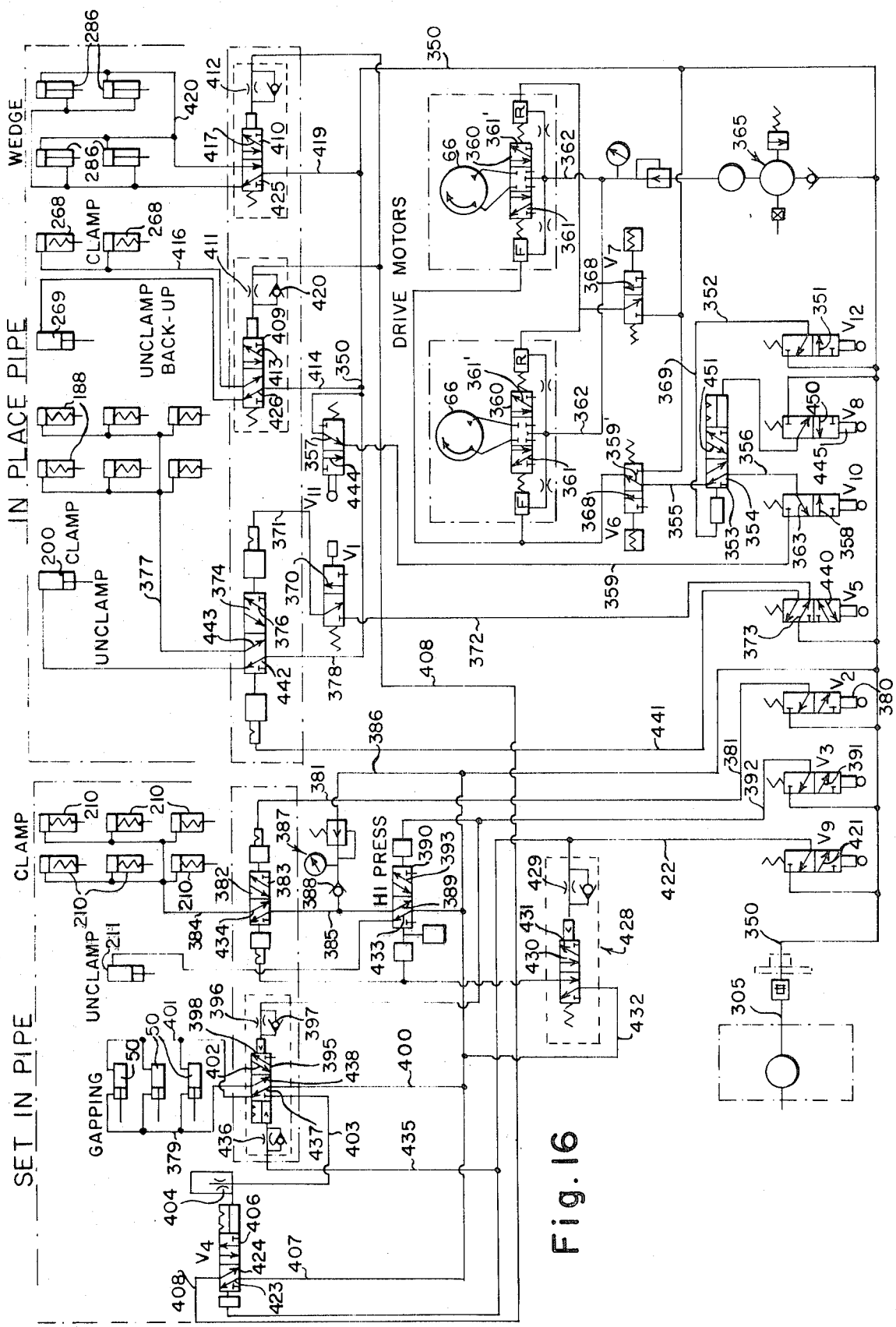
FIG. 16 is a circuit diagram of the pneumatic control system utilized in operating the pipe clamp of the present invention.

Reach rod 52 is operatively connected to control valve system 62, as more fully described hereinafter with reference to FIG. 16, to control the various pneumatic operating rams and motors of the invention.

Initially, in this specification, the structure of the clamp and the components thereof are described and thereafter the complete operation of the device will be described in sequence in relation to the pneumatic circuit diagram of FIG. 17.

Clamp 10 is provided with a drive mechanism 65 which is mounted in housing 26. The latter section is the section of the clamp which is positioned in the in place pipe 12 of the pipeline and thus will always be enclosed by a pipe during the pipeline construction process. Thus, the drive mechanism 65 will always be engaged with the interior surface of the pipeline to drive the clamp through the pipeline to the free end thereof and the next joint to be welded.

Figure 10:
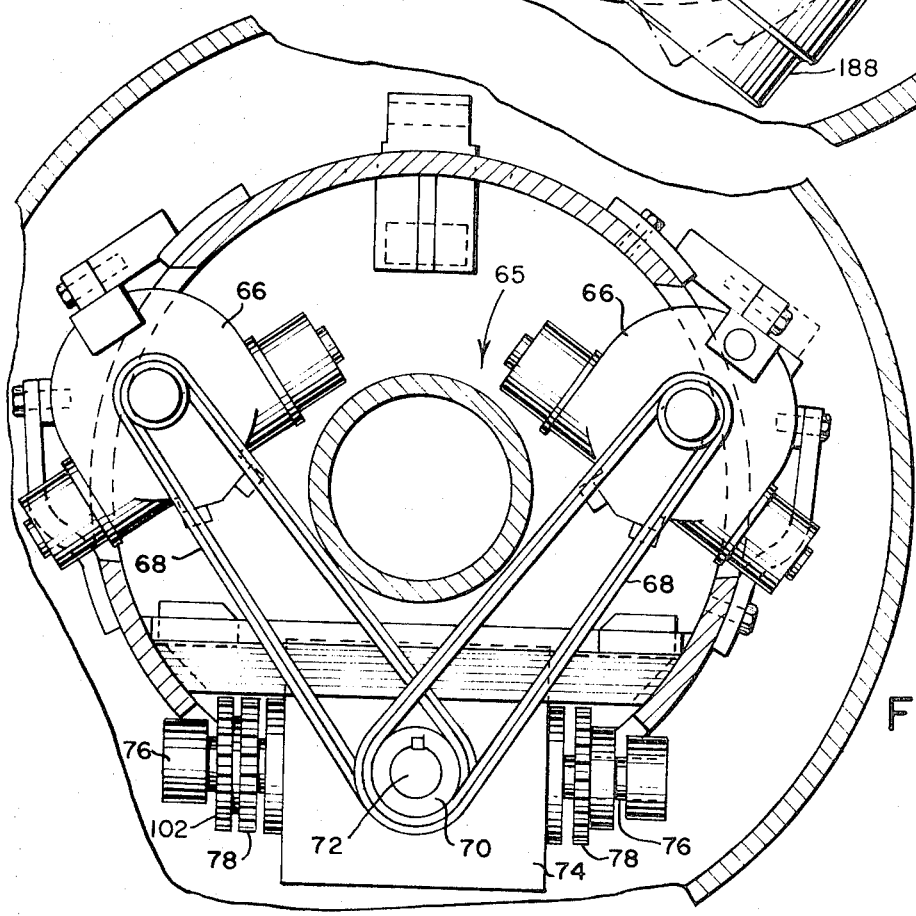
FIG. 10 is a sectional view, with parts removed, taken on line 10—10 of FIG. 1 and illustrating the drive mechanism of the present invention.

Drive system 65 includes a pair of air powered motors 66 (FIG. 10) which are connected by chains 68 to a pair of sprockets 70 on the projecting shaft 72 of a gear box 74. The latter includes a perpendicularly extending drive shaft 76 having sprockets 78 at the ends thereof. Chains 80 connect sprockets 78 to the sprockets 82 mounted on a driven shaft 84 which is rotatably mounted in a support 86. A pair of triangularly shaped wheel mounting frames 88 are secured to shaft 84 and wheels 90 are rotatably mounted at the corners 94 of frame 88 on driven shafts 96. Sprockets 98 are mounted respectively on shafts 96 and are driven from sprockets 99 on shaft 84 by chains 100 so that when motors 66 are operating, wheels 90 provide a driving force against the inner surface of the in place pipe 12 to move the clamp 10 through the pipeline.

A sprocket 102 is also mounted on shaft 76 and is connected through cain 104 to drive a sprocket 106 rotatably mounted at the upper portion of housing 26. A spur gear 108 is formed integrally with sprocket 106 and is in meshing engagement with a spur gear 110. The latter is rotatably mounted on a lever 112 pivotally mounted on housing 26 on the shaft 114 of sprocket 106. Spur gear 110 has formed integrally with a drive wheel 117 (or alternatively, rigidly mounted in its shaft 116). The latter is driven from motors 66 and gear box 74 through chain 108 and the meshing engagement of gears 108 and 110.

Lever 112, and thus wheel 117, are urged upwardly towards the inner surface of the pipe 12 by a spring biasing arrangement 118 which is operative between the end 120 of lever 112 and a stop 122 on housing section 26. In this manner, a positive pressure is provided between the wheel 117 and the inner surface of the pipeline to assure that the wheels 90 and 116 are in driving engagement with the pipe during movement. The pivotal mounting of wheel 117 accommodates variations in the inside diameter of the pipe and permits the drive system to accommodate these variations. Similarly, the pivotal mounting of two drive wheels 90 assures that at least one of these wheels is always drivingly engaged with pipe 12 even when the clamp is going over a slight hump or rise in the pipeline which would cause one of these wheels to rise off the pipeline's inner surface. Alternatively, it is contemplated that, in lieu of the pivotal mounting, the drive wheels 90 may be rigidly mounted on the housing. A conventional chain or belt tightener 124 is provided for chain 104 to insure that driving engagement between the chain 104 and sprockets 106 and 102 is maintained.

Figure 2B:
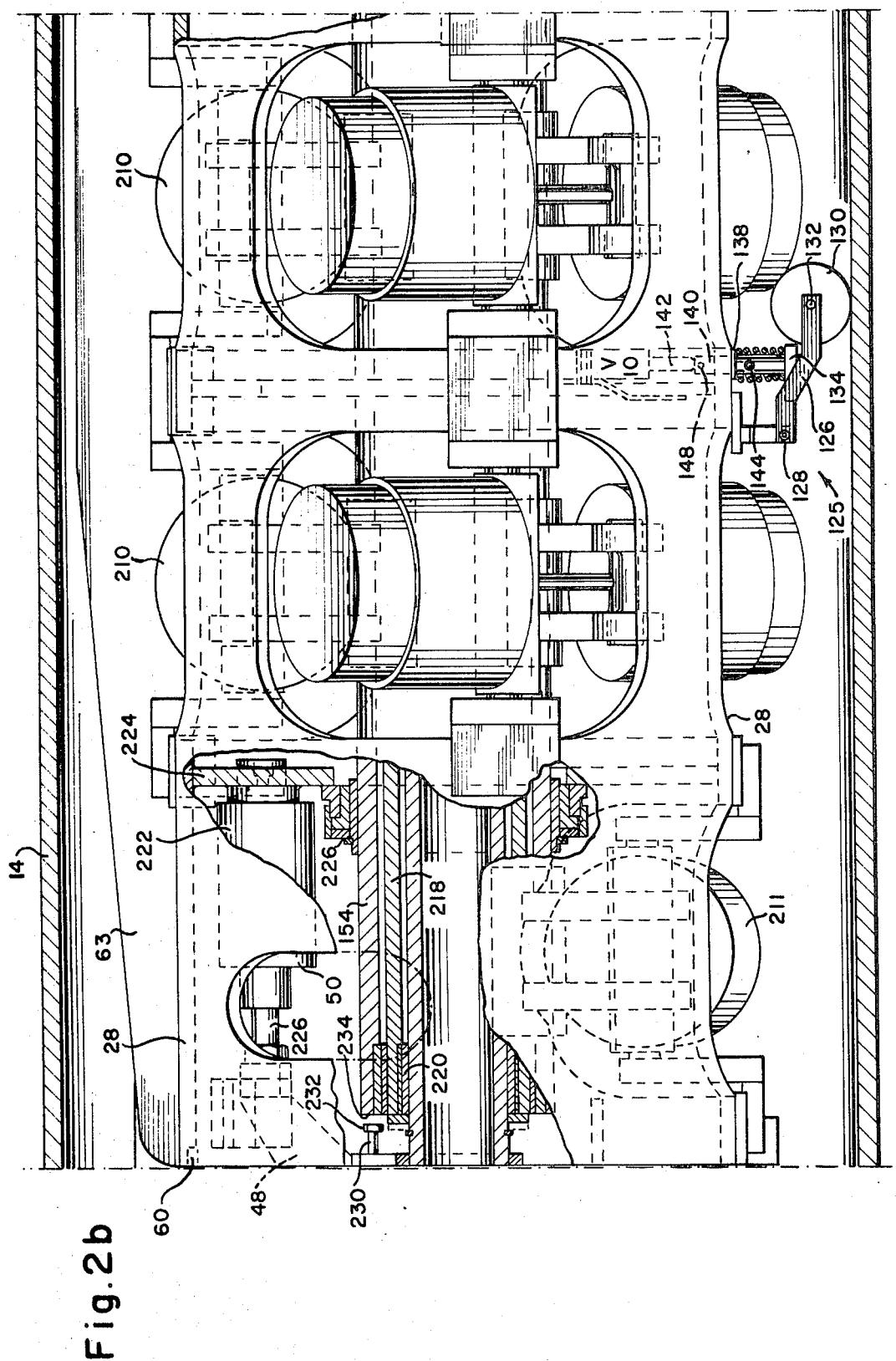
Figure 2C:
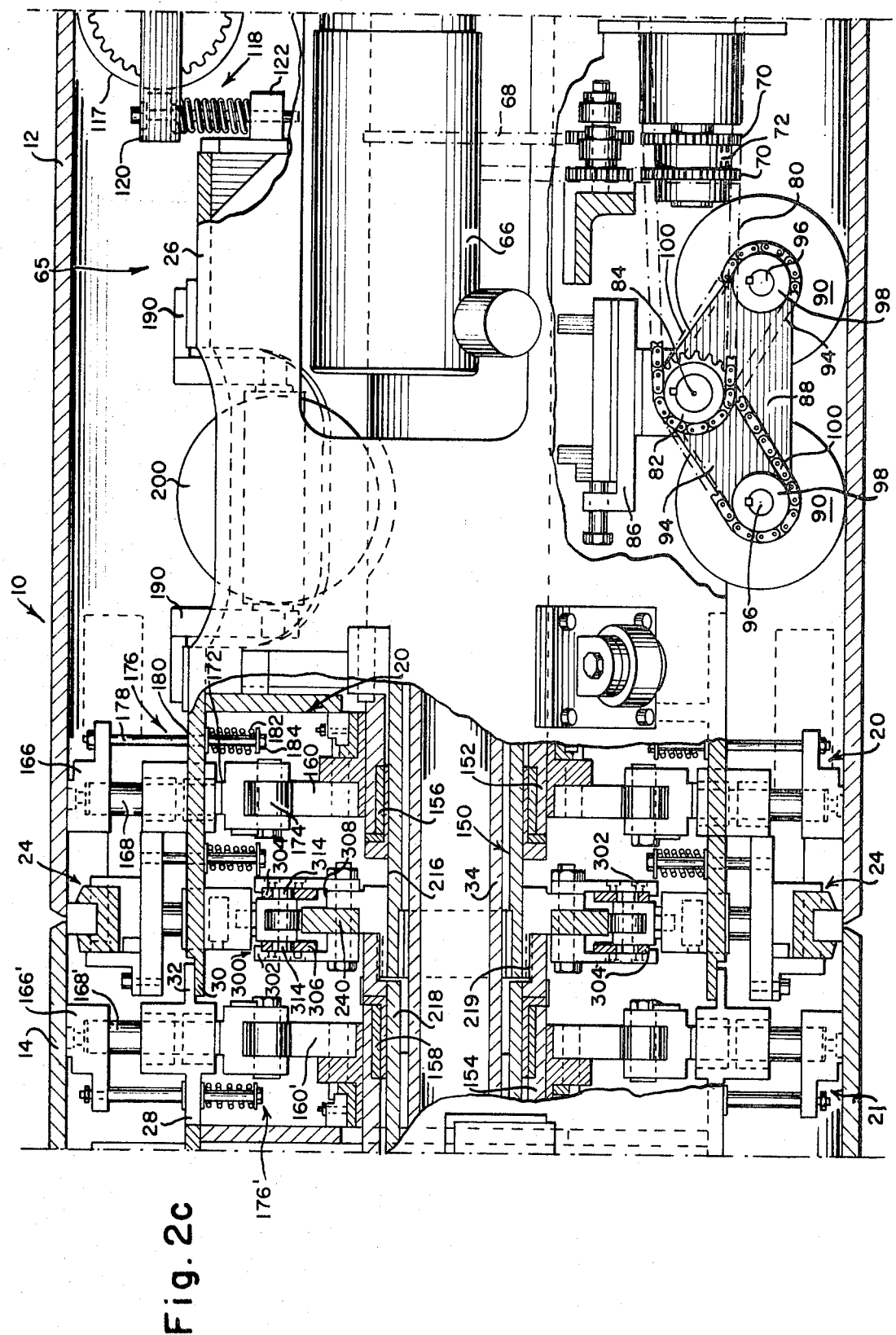

A motor control mechanism 125 is mounted on housing section 28 to control the operative mode of the motors 66. Control mechanism 125 includes a lever or pipe sensing means 126 pivotally mounted on housing 28 at pivot point 128 and having a wheel 130 rotatably mounted at its free end 132. Lever 126 is biased downwardly, in a generally clockwise direction, as seen in FIG. 2b, by a spring biased rod 134, into engagement with the inner surface of a surrounding pipe. Upward movement of lever 126, due to engagement of the wheel 130 with the pipe, is limited by a stop 138 formed on rod 134. The end 140 of rod 134 is operably connected to the stem 142 of a valve $V_{10}$ which controls the operative state of the motors 66.

As the clamp assembly is driven through the pipeline to the free end thereof and the next joint to be welded, wheel 130 passes the free end of the last welded pipe, i.e., pipe 12, and is urged downwardly by the spring 138. As a result rod 134 operates or deactivates valve $V_{10}$ to stop motors 66. Rod 134 is formed in two parts which are pivotally interconnected at 144 to accommodate the arcuate movement of lever 126 and downward motion of the rod 134 is limited by a stop 148 which engages the inner surface of the housing 20.

The location of the control mechanism 125 with respect to the backup shoe assembly 24 and clamp mechanisms 20 and 21 is selected such that after the motors 66 are shut off, the entire clamp 10 will coast to a stop, due to its weight and size, at a position wherein the backup shoe assembly 24 is close to or substantially in concentric alignment with the free end of the next pipe joint to be welded. This feature is extremely advantageous since it eliminates a substantial amount of the manual labor previously required with clamps of this type to align the backup shoe or the pipe clamp members with the end of the pipe to assure proper operation thereof.

In the event that there is some slight misalignment so that the clamp 10 must be moved, control valves (not shown) are provided which can be manually operated before pipe 14 is set in to operate motors 66 in the forward or reverse directions for an instantaneous period of time in order to "jog" the clamp into its proper position.

After the clamp is properly positioned in this manner, clamping systems 20 and 21 are extended, as described hereinafter, to secure clamp 10 in position and to maintain the end 18 of set in pipe 14 in a predetermined spaced relationship with respect to the end 15 of the in place pipe 12. In this regard, clamp 10 is provided with a first or inner torque tube 150, utilized in conjunction with the backup shoe assembly more fully described hereinafter, which receives and is rotatably mounted on support tube 34. A pair of second or outer torque tubes 152 and 154, utilized to operate clamping systems 20 and 21, are also provided which receive torque tube 150 and are rotatably and slidably mounted thereon by bearings 156 and 158.

Figure 4:
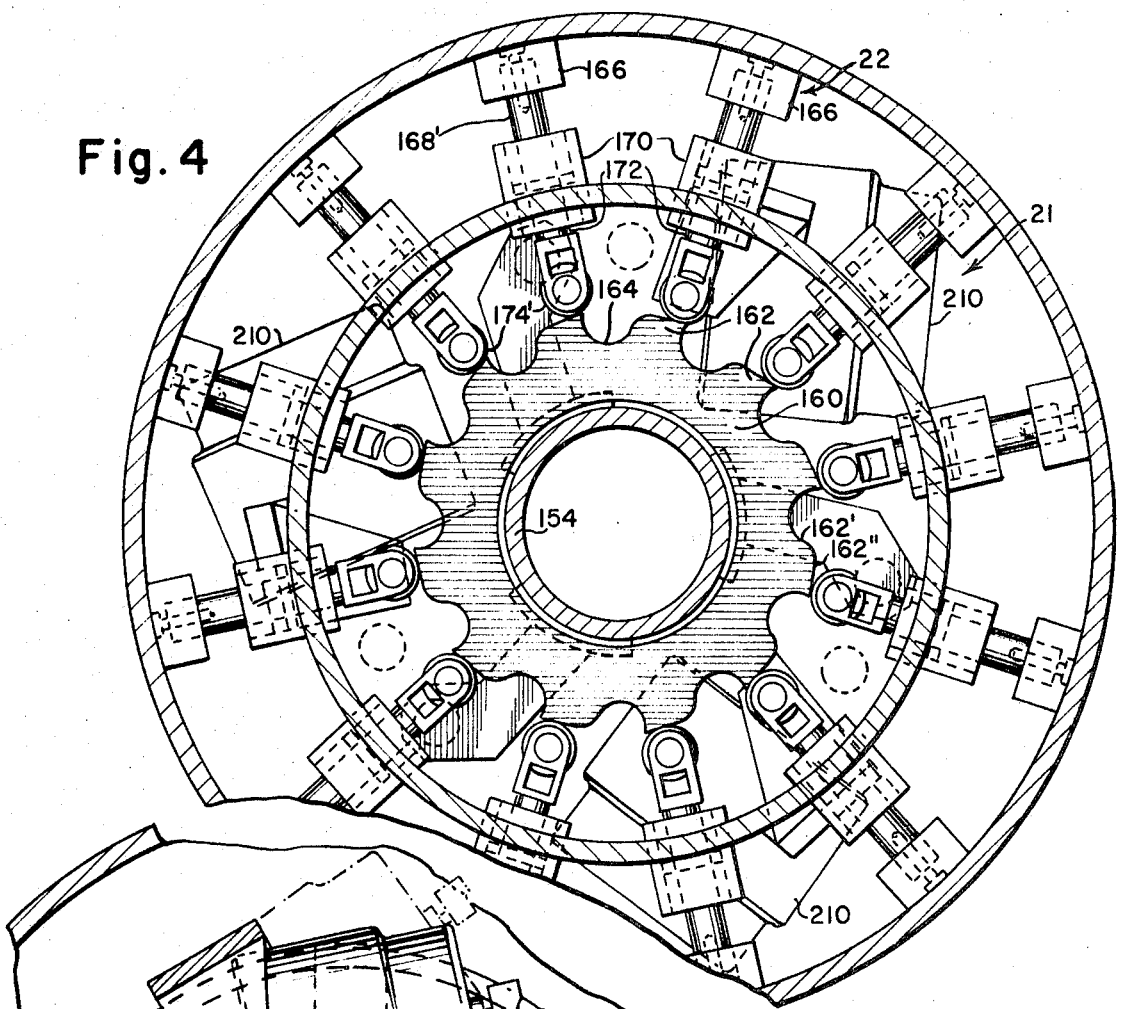
FIG. 4 is a sectional view taken on line 4—4 of FIG. 1 illustrating the apparatus for extending and retracting the clamping members.

The clamping system 20 is utilized for the in place pipe 12 and is mounted in housing section 26. This system includes an annular cam 160, rigidly secured coaxially to torque tube 152, having a plurality of cam lobes 162 and recesses 164 along its peripheral edge portion. Cam 160 is adapted, upon rotation, to selectively extend or retract the clamping members 22 of system 20, which clamping members include pipe engaging heads 166 having slightly arcuate surfaces to firmly engage the inner surface of the surrounding pipe 12. It is noted that the physical construction of clamping system 20 is identical to that of system 21, which is shown in detail in FIG. 4.

Stems 168 are secured to heads 166 and are slidably mounted in collars 170 welded or other wise secured to housing section 26. The ends 172 of stems 168, within housing section 26, are provided with roller type cam followers 174. These cam followers are adapted to be engaged with the peripheral surface of cam 160 and the lobes 162 and recesses 164 formed thereon. Positive engagement between each of the cam followers 174 and the periphery of cam 160 is assured and maintained by means of a spring biasing system 176 associated with each of the heads 166. System 176 includes a rod 178 secured at one end to each of the shoes 166 which extends through an aperture 180 formed in housing section 26. A spring 182 is positioned between the inner surface of housing 26 and the head 184 of the rod so as to bias the heads 166 in a radial direction towards cam 160.

In the inactive configuration of clamping members 22, cam followers 174 are located in the recesses 164 of cam 160 and thus the clamping members are retracted to permit clamp 10 to pass through the pipeline. When the clamp 10 is in the desired position adjacent the free end of the set in pipe 12 clamping members 22 are extended by rotating cam 160 so that cam followers 174 ride over the surface of the lobes 162 to approximately the high point thereof. It is noted that the lobes 162 have a relatively steep initial portion 162' leading from recesses 164. This configuration provides a substantial amount of clearance between heads 166 and the internal surface of the pipes when the clamps are in the retracted position, to facilitate travel of the clamp through the pipeline and particularly through bends in the pipe. Motion of the clamp shoes through the clearance dimension does not require great force and the force required is only that necessary to overcome friction in the various bearing surfaces, e.g., between rollers 174 and surface 162. Lobes 162 each also include a second relatively flat inclined surface 162" whose lower ends are located to engage their associated rollers 174 when clamps 166 are extended to the minimum possible diameter of the pipe. The inclination of this flat section determines the mechanical advantage and hence the radial thrust of the clamping shoes. Moreover, the flat inclined plane provides for a constant radial thrust applied to the pipe through clamps 166.

Figure 2D:
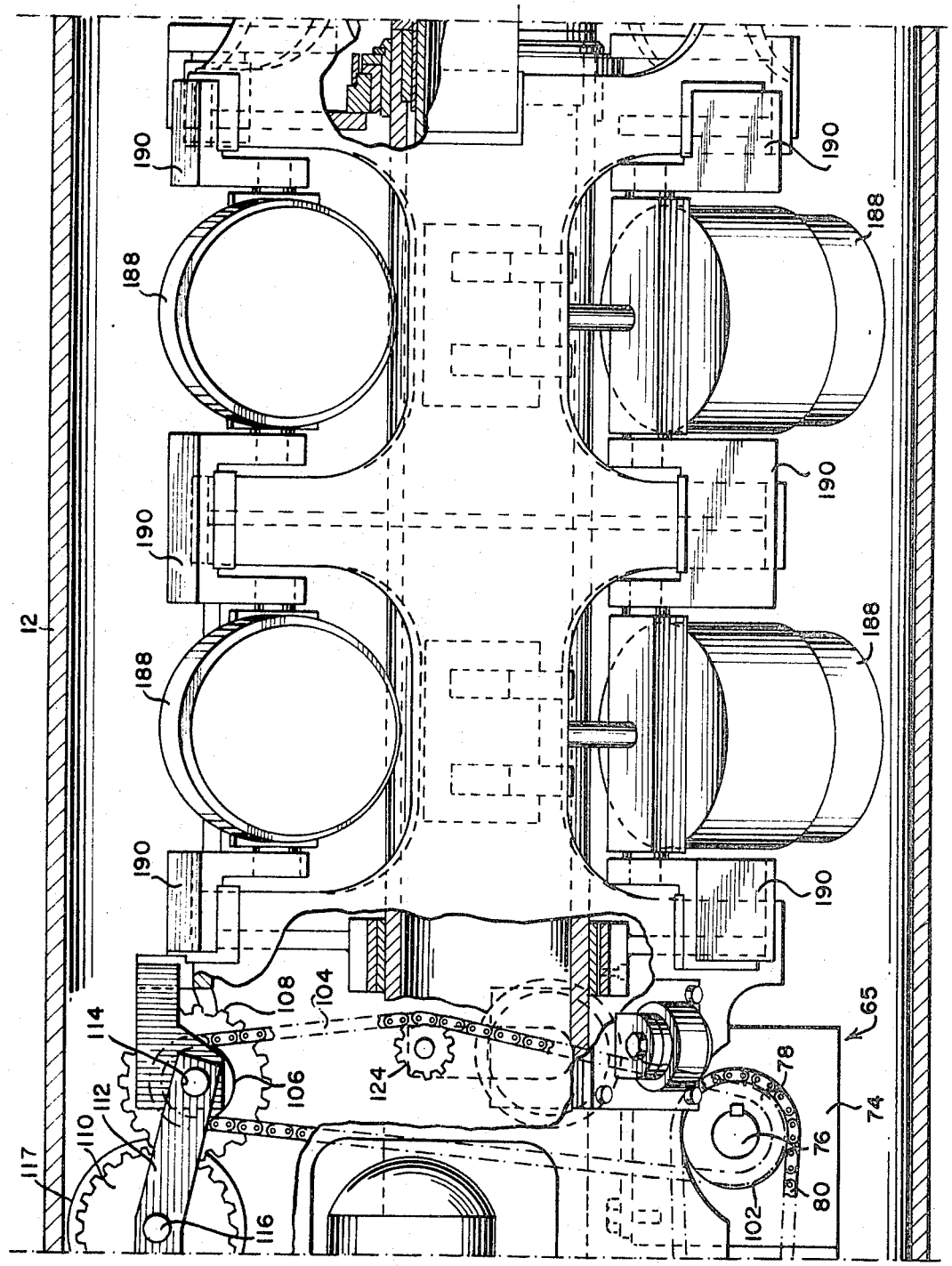
Figure 11:
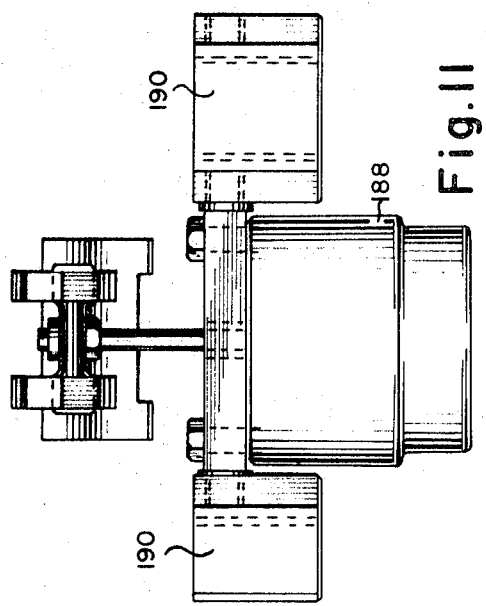
FIG. 11 is a plan view of a typical mounting system for the pneumatic rams utilized in the present invention.
Figure 12:
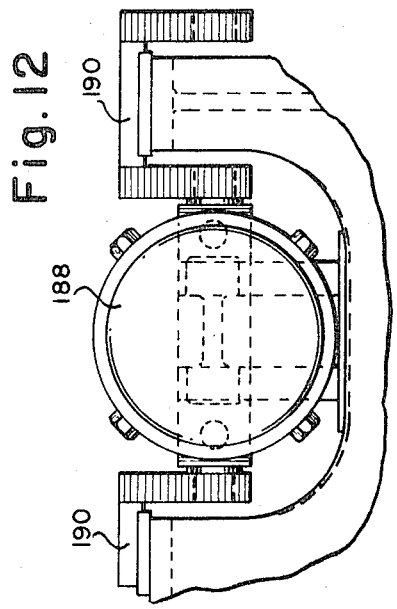
FIG. 12 is an elevational view of the mounting system illustrated in FIG. 11.
Figure 2E:
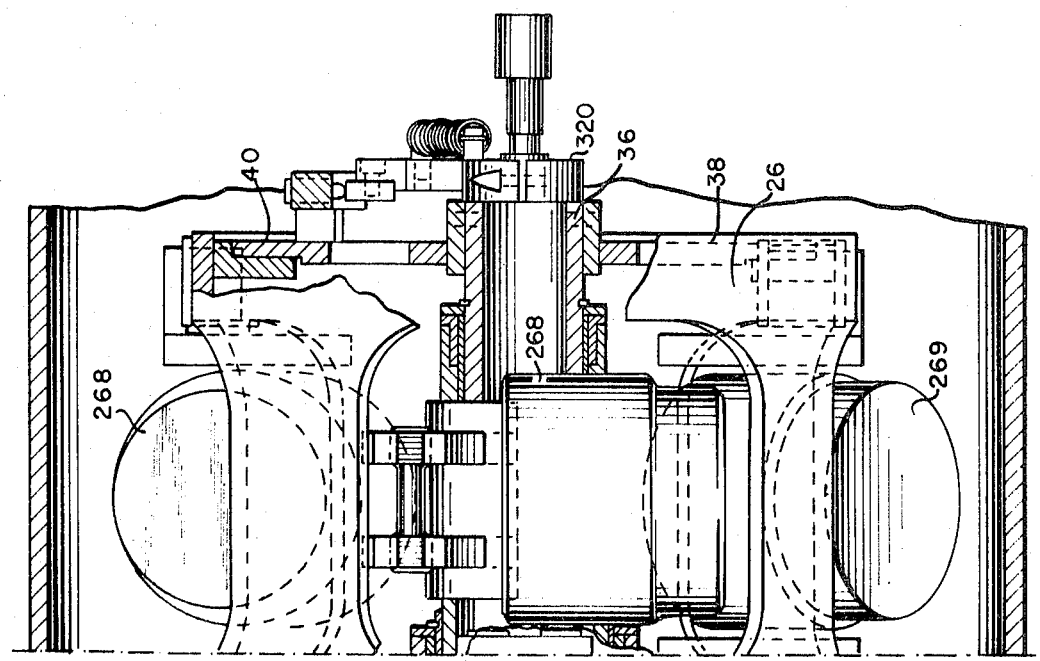
Figure 5:
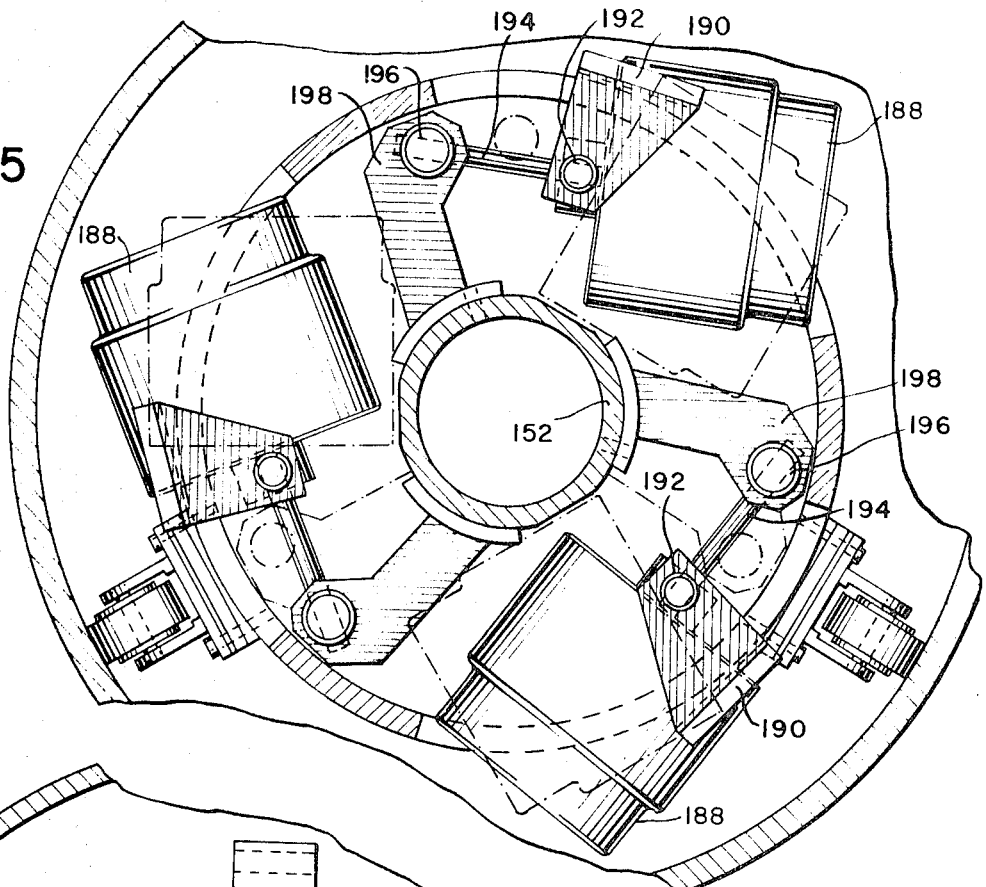
FIG. 5 is a sectional view taken on line 5—5 of FIG. 1 illustrating the ram mounting system for rotating the second torque tube and extending the clamping members.

Rotation of cam 160 is achieved by rotating torque tube 152 by means of six single acting pneumatic rams 188 (two of which are hidden from view in FIG. 2d). Rams 188 are rotatably mounted in blocks 190, in pairs of three, evenly spaced about the periphery of housing section 26. The mounting arrangement of these rams is illustrated in FIG. 5, wherein it is seen that each ram is mounted by pivot pins 192 in blocks 190. The actuator rods 194 of the rams are pivotally connected in pins 196, which pins are pivotally mounted in arms 198. The latter are rigidly secured to the surface of torque tube 152. Accordingly, it is seen that upon actuation of rams 188, and extension of their actuator rods, torque tube 152, and thus cam 160, is rotated to extend clamping members 22.

It is noted that FIG. 5 illustrates the extended position of the rams 188 in solid lines and the retracted position thereof in dotted lines. It is evident therefore that the pivotal mounting of the rams accommodates the arcuate movement of the arms 198 as the rams rotate the torque tube 152. From this construction it is seen that the actuating mechanism for extending the clamping system is located at a position somewhat remote from the clamping system itself. This configuration provides for a compact clamp assembly which is efficient in operation and permits operation of the device in relatively small pipelines. In previously proposed pipe clamp arrangements, a substantial portion of the actuating mechanism is located immediately adjacent the clamping members and utilizes a variety of links and levers, to provide the radial movement. By the construction of the present invention the use of such links and levers is avoided and radial movement is provided by a simple cam and cam follower arrangement with the full force of six pneumatic rams operating to rotate the cam. It is noted that by this construction the force applied to clamp members 22 is sufficient to move the end of pipe 12 to a true cylindrical shape so as to overcome any out of roundness in the pipe. The clamping system 21 has the same feature, so that prior to welding the adjacent ends of the pipes to be welded are made circular to assure proper welding.

To retract clamp members 22, a single ram 200 is utilized which is mounted in blocks 190 in a similar manner to the previously described rams and is secured in a similar manner to the torque tube 152. The ram 200 also is a single acting pneumatic ram, but it acts in the opposite direction from rams 188 and this single ram supplies sufficient power to rotate torque tube 152 and cam 160 to their original position. Clamp members 22 then collapse to their retracted configuration under the influence of spring 182, with cam followers 174 moving back into recesses 160.

After clamping members 22 of clamp mechanism 20 are extended and firmly engaged with the adjacent edge of the in place pipe 12, the set in pipe 14 is slid over housing section 28 of the clamp and its free end is moved into abutting engagement with the end of pipe 12. However, clamping members 22 are not yet extended and pipe 16 is not in circumferential alignment and in exact juxtaposition with the end of pipe 12, until clamping members 22 of clamping mechanism 21 are extended.

Clamping mechanism 21 includes a cam 160', similar to cam 160 of clamping mechanism 20, rigidly mounted on torque tube 152. Clamping members 22 of system 21 include stems 168' and cam followers 174' similar to stems 168 and 174 previously described, and the cam followers are spring biased against cam 160' by a spring mechanism 176'. Cam 160' and torque tube 154 are rotated in a manner similar to cam 160 and torque tube 152, to extend and retract clamping members 22. To this end, two sets of three pneumatic ram members 210 are provided which are pivotally mounted on blocks 190 in a manner similar to that of the rams 188 previously described. However, these rams are controlled by a valve control mechanism, more fully described hereinafter, by which the rams are first extended by a light pressure to an intermediate position, between that in which the clamping members are either fully retracted or fully extended, and at which the resistance provided by engagement of heads 166 with the pipe 14 prevents further extension of the clamps under this "light" pressure. At this point the stresses in the pipe balance the forces applied by the ram. The pressure applied is relatively small so that some manual adjustment of the pipe in relation to the in place pipe 12 is possible. Thus, after the set in pipe is positioned about the housing 28, with its end 18 against and adjacent the end 16 of pipe 12, rams 210 are actuated to rotate torque tube 154 about its longitudinal axis and thus rotate cam 160' to extend clamping members 22 of clamping mechanism 21. However, since the initial pressure supplied to the rams 210 is relatively light, rotation of tube 154 is stopped before the cams are fully extended dut to the tension produced in the pipe wall on contact therewith. As a result, pipe 14 may be manually adjusted on the extended clamps with its end in abutment with the circumferential free edge 16 of pipe 12, made "iron bound" as termed in the trade, so that its edge 18 abuts the edge 16 of pipe 12 about its entire circumferential length. When this condition is established, increased pressure is applied to pistons 210 so that torque tube 154 is further rotated until this increased pressure is balanced by the increased tension forces in the pipe which then resist further extension of the clamps and thus further rotation of torque tube 154 by pistons 210. As a result, the clamping members 22 of clamping mechanism 21 are now tightly engaged with the inner surface of pipe 14 with the edge of set in pipe 16 firmly clamped in place about housing section 28. Any out of roundness of the pipes at the joint is corrected by the pressure applied thereto by the clamping mechanism with the two pipes 12 and 14 held in alignment.

A single ram 211, corresponding to ram 200, is provided to rotate the torque tube 154 in an opposite direction from rams 210 so that the clamp members 22 of clamping mechanism 21 may be retracted under the influence of spring 182'.

In many types of welding processes, it is often desirable that the edges of the pipes to be welded be spaced from one another a predetermined distance. This space must be accurate all about the circumference of the pipeline to be welded so that the weld has uniform characteristics. This spacing has usually been achieved manually by inserting wedges or the like between the edges of the pipes after they have been made "iron bound" or by "eyeballing" the space about the periphery of the pipes before the clamps were extended. In accordance with the present invention, the spacings of the ends of the pipelines is achieved in an extremely accurate process. To this end, apparatus is provided for simply moving the set in pipe axially with respect to the in place pipe 12. This axial movement will provide an accurate gap between the pipe ends all about the periphery. To achieve this the outer torque tube sections 152 and 154 are slidably mounted on bearings 156 and 158 respectively. The latter are respectively mounted on tube sections 216 and 218 of inner torque tube 150. The left end 234 of tube 154 is also slidably and rotatably mounted on a bearing 220 (FIG. 2b) secured to tube section 218. These two tube sections (216 and 218) are threadedly interconnected in a male-female relation at 219 so that no axial movement therebetween is permitted, however, these sections are rotatably mounted on support tube 34 for reasons fully described hereinafter.

The previously mentioned rams 50, which interconnect members 48 and housing section 28, are pneumatic rams having cylinder portions 222 rigidly secured to the housing section 28 by an extension 224, which extension also is rigidly secured to a bearing 226 on torque tube 154. Bearing 226 permits relative rotation of torque tube 154 with respect to extension 224 but is constructed so that lateral movement between torque tube 154 and extension 224 is prevented.

Actuator rod 226 of ram 50 is rigidly connected to one of the arms 48 mounted on support rod 34. There are three rams 50, evenly spaced about housing 28, and each ram is connected in the same manner as that illustrated in FIG. 2b. After the clamping members 22 of clamping mechanism 21 are fully extended, rams 50 are simultaneously operated to retract their actuator rods 226 into the cylinders 222. Since rods 226 are rigidly secured to webs 48, which, in turn, are rigidly secured to support tube 34 and thus housing section 26, the cylinder portion 222 will move to the left in FIG. 2b. As a result, housing section 28 and torque tube 154 move to the left therewith with tube 154 sliding on bearings 158 and 220. Since cam 160' is secured to torque tube 154 and since the stems 168' are secured in housing section 28, clamping mechanism 21 moves to the left with the housing section 28. Since the set in pipe 16 is rigidly secured to clamping members 22 of set 21, due to their extension against the inner surface thereof, pipe 14 is moved to the left with its end 18 spaced from the end 16 of pipe 12.

A stop member, such as for example, a bolt 230, having a stop head 232, is secured to collar 46 and is positioned to engage the end 234 of torque tube 154 to limit lateral movement thereof. Bold 230 may be adjusted prior to operation of the device so that the gap between its head 232 and the end 234 of the torque tube 154 is equal to the predetermined distance which it is desired to space the ends 212 and 214 of the pipes. It is clear that when the end 234 of the torque tube 154 engages the head 232 of the nut 230 further movement of the housing section 28 and the torque tube 154 with respect to the remainder of the apparatus is prevented. In this manner it is seen that a convenient and compact system is provided for accurately aligning the ends of a pair of pipes in a pipeline, overcoming out of roundness of the individual pipe ends and spacing the pipe ends a predetermined distance.

After the clamping mechanisms 20 and 21 have been extended and the pipe ends 16 and 18 spaced in the manner described above, the weld joint backup assembly 24 is activated and extended into engagement with the inner surfaces of the adjacent pipe ends to support molten weld metal during the welding operation. Backup shoe assembly 24 includes a cam 240 rigidly mounted on the section 216 of torque tube 150. Cam 240 includes four lobe sections 242 which are engaged by cam followers 244 for extending and retracting the backup shoe assembly. The assembly also includes a number of individual backup shoes 246. While in the preferred embodiment of the present invention, four such shoes are utilized, it is contemplated that two or three shoes may also be utilized in accordance with the construction of the present invention, as would be clear to one skilled in the art.

Figure 6:
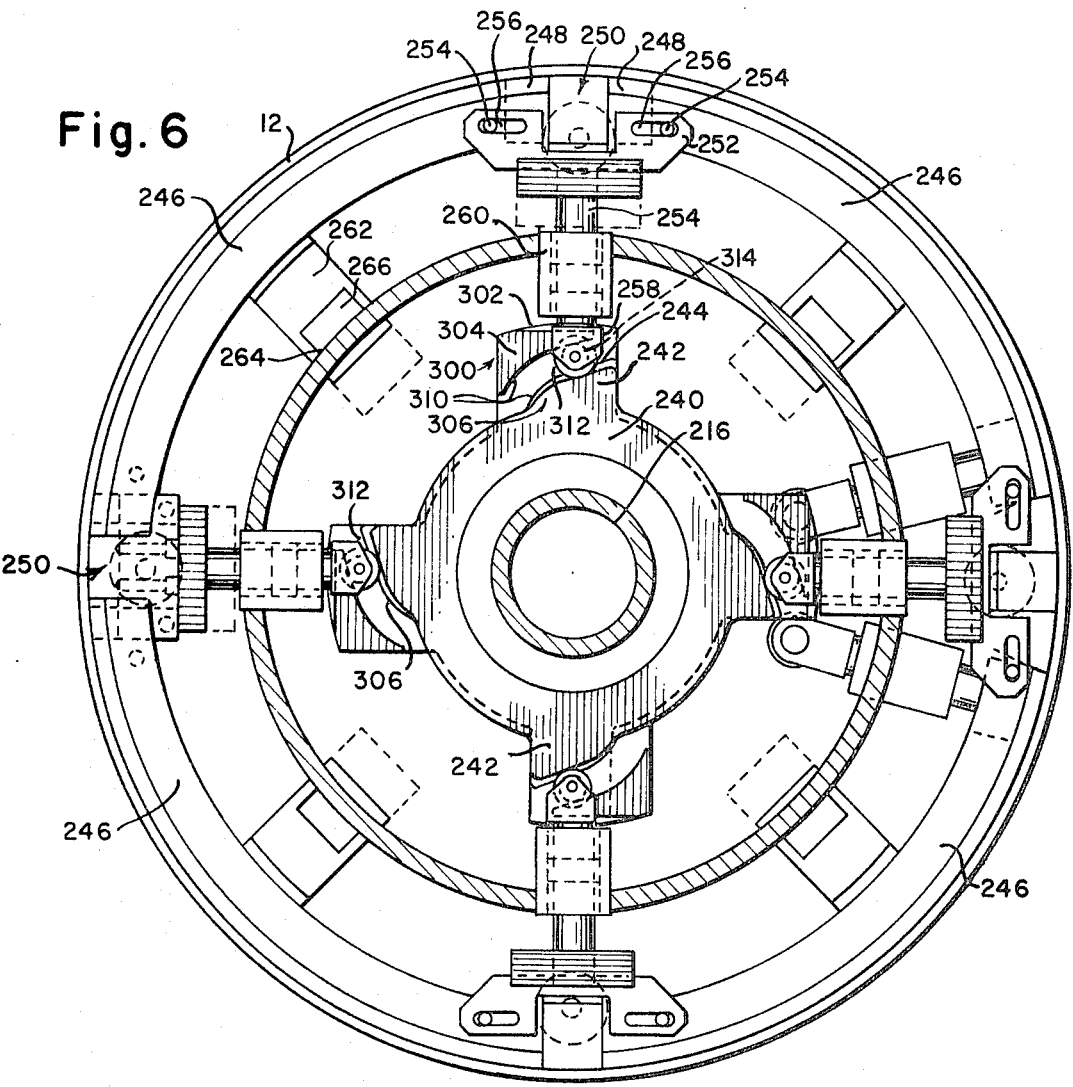
FIG. 6 is a sectional view taken on line 6—6 of FIG. 1 illustrating the backup shoe assembly of the present invention.

In the illustrative embodiment seen in FIG. 6, the four shoes 246 each define a substantially 90° sector of the assembly. In the retracted position of the assembly, the ends 248 of the shoes are in substantially adjacent relation with each other, but as the shoes move apart during extension thereof, a space or gap 250 is formed therebetween. The ends 248 of each of the shoes are operatively interconnected by a yoke member 252 through pins 254 which extend in slots 256 in the yokes. Slots 256 permit relative circumferential movement between adjacent shoes during extension of the assembly. Yoke members 252 are connected to stems 254 having cam followers 244 secured to their inner ends 258. Stems 254 are slidably mounted in collars 260 adjacent the end 30 of housing section 26 for radial movement with respect thereto. Each shoe also includes a plate-like guide extension 262 on its inner surface which extends through a slot 264 in the surface of housing section 26 to assure accurate radial extension of the shoes. A pair of tabs 266, one on each side of extensions 264 assure lateral stability of the shoes during extension and retraction.

To extend the stems 254 and thus the backup shoes 246, cam 240 is rotated so that the cam followers 244 will ride up the inclined surface of the cam lobes 242. Rotation of cam 240 is effected by rotation of torque tube 150 (216), on which it is secured. This is achieved by means of two pneumatic rams 268 which are pivotally mounted on housing section 26, in the manner illustrated in FIGS. 2e and 7. The third ram illustrated therein, i.e., ram 269, is utilized to retract the backup shoe assembly.

Figure 7:
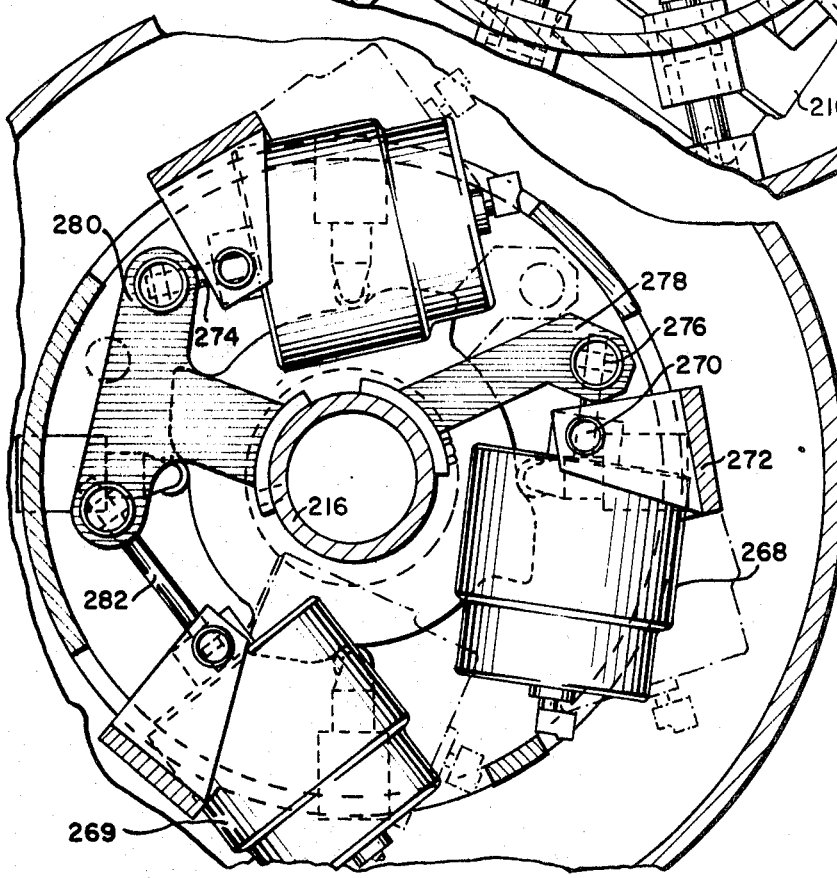
FIG. 7 is a sectional view taken on line 7—7 of FIG. 1, illustrating the ram mounting system for rotating the torque tube on which the cam member of the backup shoe assembly is mounted.

Each ram 268 and 269 is pivotally mounted by a pin 270 in blocks 272 secured to housing section 26. The actuator rods 274 of the rams 268 are pivotally connected through pins 276 to arms 278 and 280 respectively which arms are secured to tube member 216 of torque tube 150. Arm 280 is a generally T-shaped member, as seen in FIG. 7, and actuator rod 282 of ram 269 is pivotally connected thereto in a similar manner to that of the ram 268, for rotating the torque tube 150 in an opposite direction to return the cam 240 to its initial position for retraction of the backup shoe assembly.

Figure 8:
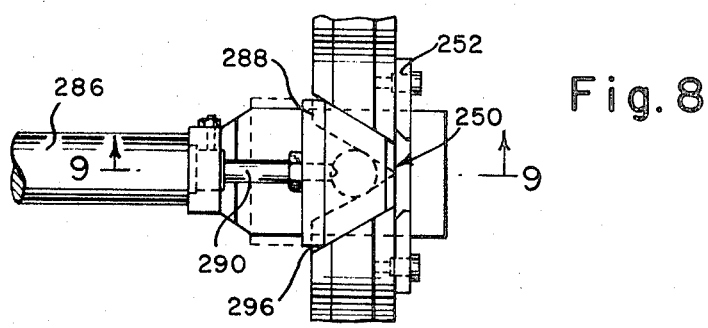
FIG. 8 is an enlarged plan view of the backup shoe segment inserted between the adjacent ends of a pair of backup shoes.
Figure 9:
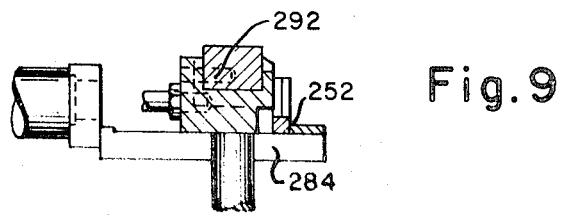
FIG. 9 is a sectional view taken on line 9—9 of FIG. 8.
Figure 13:
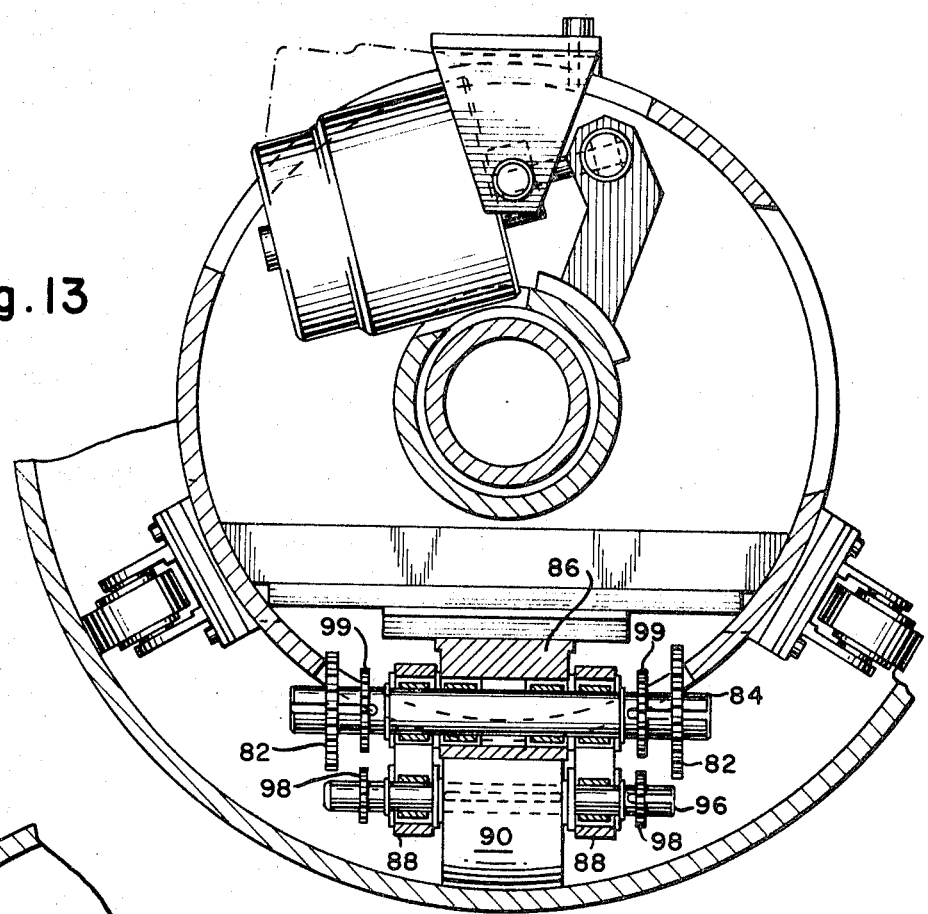
FIG. 13 is a sectional view taken on line 13—13 of FIG. 1.
Figure 14:
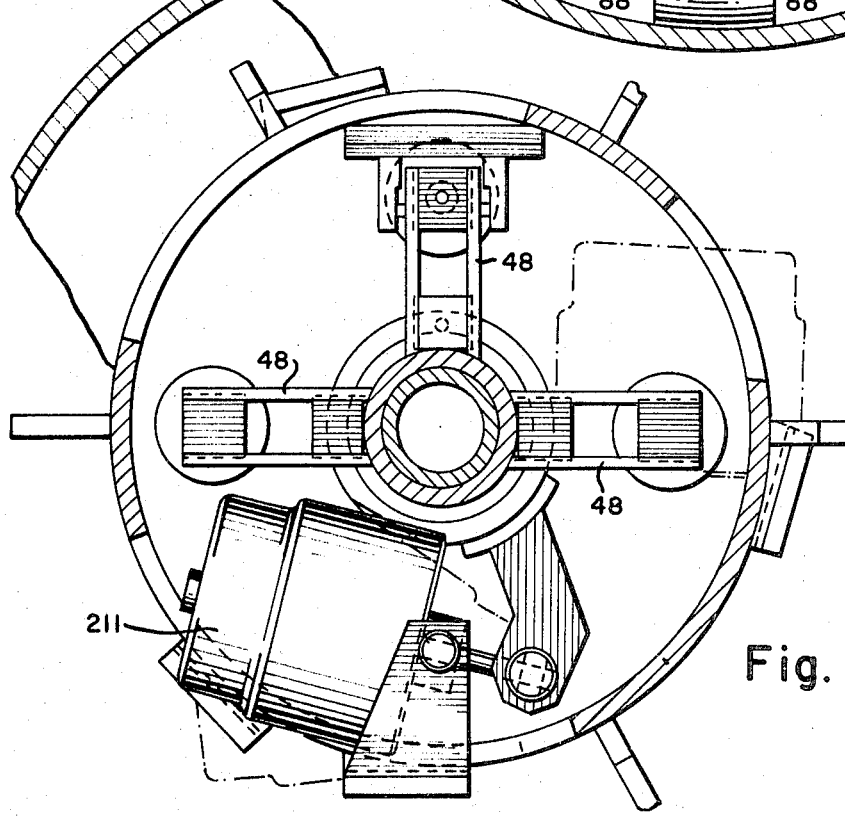
FIG. 14 is a partial sectional view, with parts broken away, taken on line 14—14 of FIG. 1.

Yokes 252 each include a platform 284 on which is mounted a ram 286, as seen in FIGS. 8 and 9, having a wedge-shaped backup shoe segment 288 secured to its actuator rod 290. As yokes 252 and backup shoes 246 are extended by the actuation of rams 268, ram 286 and segment 288 rise with the yoke. Segment 288 is retracted during this portion of the movement, however, ram 286 and segment 288 are located and dimensioned such that the surface 292 of the segment is in circumferential alignment with the surfaces of the adjacent backup shoes. After the backup shoes are fully extended ram 286 is actuated to insert segment 288 into the gap 250 formed between the backup shoes due to their extension. Since the surface 292 thereof is at the same level of the adjacent shoes, a continuous backup or chill ring is formed adjacent the joint between pipe end sections 16 and 18. It is noted that because of the wedge-shaped arrangement, variations in inside pipe diameter may be accommodated within a limited range by the pipe clamp assembly of the present invention. This occurs because the size of the gap 250 will depend upon the inside diameter of the pipe and thus the depth to which segment 288 will be inserted into gap 250 will depend on the dimensions of the gap, with the wedge shape thereof and the beveled surfaces 296 of the ends of the backup shoes forming a continuous surface at all such depths.

When ram 269 is actuated to rotate the torque tube 150 in a clockwise direction, as seen in FIG. 6, so that the backup shoe assembly is retracted, the actuation thereof is delayed by pneumatic circuitry, more fully described hereinafter, so that ram 286 is activated first to withdraw segment 288 from gap 250 prior to retraction of the backup shoes. Thus, the segment 288 is moved out of the way of the backup shoes so that the gap 250 therebetween cam become smaller during retraction.

In order to assist in retraction of the backup shoes and to provide a positive retraction thereof under the influence of the ram 269, in the unlikely event that the backup shoe becomes welded to the joint by weld metal entering the joint during the welding operation, a guide track assembly 300 is mounted on torque tube section 216. Track assembly 300 includes a pair of annular plates 302 secured to both sides respectively of cam 240. A pair of insert blocks 304 and 306 is associated with each cam lobe and secured to the inner face 308 of each of the plates 302. Blocks 304 and 306 each have milled facing surfaces 310 which are positioned in spaced relation to each other to define a track 312 therebetween. The configuration of track 312 corresponds substantially to the configuration of the slope of the associated lobe 242. A pair if track followers or rollers 314 are rotatably mounted on either side of cam follower 242 and extend into the track 312 defined by inserts 304 and 306. Since the plate 302 rotates with cam 240 during retraction of the backup shoes, which rotation occurs in the clockwise direction as seen in FIG. 6, the track 312 is moved relative to the track followers 316, and because of its engagement with the track followers urges the track followers and thus stem 254 radially inwardly with respect to housing section 26 and thus positively retracts the backup shoes 246. In this manner the power supplied by ram 269 is positively applied to backup shoes 246 to retract the shoes after completion of the welding operation.

After the welding operation is completed and the backup shoe assembly is retracted as described above, clamp mechanisms 21 and 20 are sequentially retracted. Clamp mechanism 21 is retracted first so that the supporting function provided during the welding operation is released and thereafter, clamping mechanism 20 is relieved and motors 66 reactivated to drive the clamp through pipe 14 to the free end thereof (not shown) in preparation for the welding of that pipe, which has now become the in place pipe, to the next pipe in the pipeline.

The pneumatic equipment utilized in the present invention are controlled, in part, through the reach rod 52 which has a handle 301 extending beyond the end of the set in pipe 14 during the welding process. Reach rod 52 is a hollow member having a coupling 303 at the end thereof for connection to a pressurized air supply hose 305. The reach rod may also include a universal joint 307 to accommodate bends in the pipeline, with a flexible hose 309 bridging the gap between the pivotally interconnected sections thereof.

Figure 15:
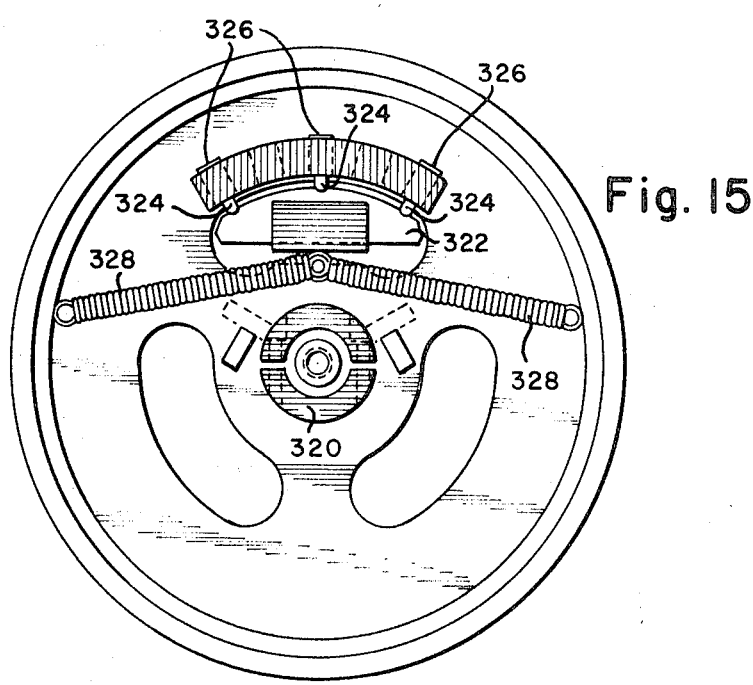
FIG. 15 is an end view of the apparatus taken on line 15—15 of FIG. 1.

A plurality of cams 311 are mounted on reach rod 52 for actuating the valves $V_2$, $V_3$, $V_9$, $V_5$ and $V_{12}$, in the bank of valves 62. Rod 52 also actuates a valve $V_8$, mounted on one of the webs 58. The operation of these valves is more fully described hereinafter. The cams 311 each have a lobe or lobes (note FIG. 3) positioned thereon for activating the associated valve member in accordance with the position to which the reach rod has been turned. The latter is rotatably and slidably mounted within support tube 34 and has an extension (not shown) which passes through the support tube 34 to the end 36 thereof and has a collar 320 secured thereto. Collar 320 includes a detent cam extension member 322 secured thereto (FIG. 15) having three recesses 324 on the surface thereof which cooperate respectively with three spring biased detent members 326, mounted on end plate 40, to provide a "feel" to the operator of the reach rod to enable him to recognize the position of the reach rod and which valves are operated in accordance with this position. The "feel" is further enhanced by a pair of spring members 328 which bias the cam member 322 to its center or neutral position.

The sequential operation of the apparatus and the pneumatic circuit diagram illustrated in FIG. 16 shall now be described in details with respect to that circuit diagram. Initially, it is assumed that the weld between a pair of pipeline segments has been completed and all of the components of the apparatus are returned to their inactive positions so that the clamps and backup assembly have been retracted, the drive motor is shut off and the rams 50 have been extended so that the housings 26 and 28 are no longer extended with respect to each other.

Normally air is supplied from a source of pressurized air through the hose connection 305, although an air reservoir supply system 365 is mounted on the housing and connected to the air supply line 350 for use in operating the equipment, as required, during those periods when a hose 305 must be disconnected from the reach rod 52, e.g., when a set in pipe must be placed around the apparatus.

Figure 17:
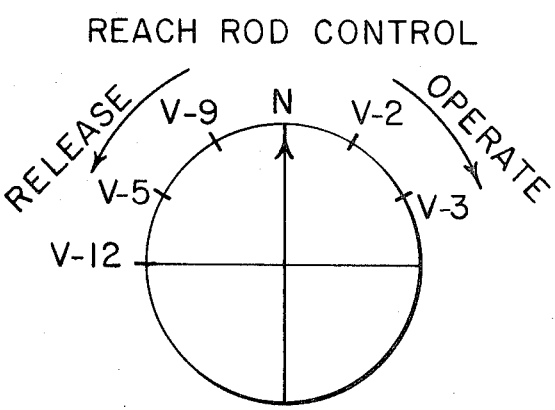
FIG. 17 is a diagrammatic illustration of the positions of the cam control members activated by the reach rod utilized in the clamp mechanism of the present invention.

The operator initially turns the reach rod from its neutral position, as illustrated in FIG. 17, to the extreme left to activate valve $V_{12}$. By doing so he connects the supply line 350, through port 351 of the valve $V_{12}$, to line 352 to the left side of control valve 353. The application of air from the line 350 against control valve 353 connects port 354 between the lines 355 and 356 to permit air to flow to motors 66 to drive the clamp. However, air flow to the motor also is controlled by valve $V_{11}$, which is operatively connected to the clamping systems 20 and 21 so as to prevent driving of the motors when the clamps are up. Thus, in the initial starting position, with the clamps down, valve $V_{11}$ is opened and in the position shown with its port 357 operatively providing communication between the supply line 350 and the valve $V_{10}$. This valve, which is the trip valve operated by the control mechanism 125, is shown in its closed position, as it would be if no pipe were surrounding the housing. When a pipe is surrounding the housing, the port 358 of valve $V_{10}$ is connected between the line 359 and the line 356 so that air from the source may flow through line 356 and port 354 to the "forward" control valve $V_6$ of motors 66. This valve is normally in the configuration shown and thus when port 354 is connected to line 356 air can flow through the port 359' of valve $V_6$ to the motor control valves 360. The application of air on the left side of these valves causes the valves to shift to the right so that the ports 361 thereof move into alignment with the air supply line 362 which is connected through the air reservoir system 305 to the air supply line 350. It is thus seen that air flows to the motors on the forward side as indicated by the arrows applied to the motors, to drive the motors in a forward direction and move the apparatus through the pipeline.

When the control mechanism 125 passes the free end of in place pipe 12, valve $V_{10}$ is closed by the downward movement of arm 126 so that the air supply through port 358 is stopped. As a result the port 363 of that valve is connected to the line 356 as an exhaust and the air pressure on the left side of the valves 360 is dissipated so that the valves return to their neutral position, illustrated in FIG. 16, to stop the motors. The clamp assembly then coasts to a stop as previously described, with the backup shoe assembly 24 in substantial alignment to be welded. In the event that the backup shoe assembly is not in alignment with the end of the in place pipe, valves $V_6$ and $V_7$, which in the preferred embodiment may be "palm" valves and which are positioned adjacent the clamping assembly on housing 28, may be manually operated to connect the ports 368 thereof with the air supply line 369. The latter is connected to supply line 350, and thus the motors are briefly operated in either the forward or reverse direction by applying air pressure to the left or right side respectively of the control valves 360. It is noted that actuation of valve $V_7$ will supply air to the right of valves 360 so those valves are moved into position with their ports 361 supplying air to drive motors 66 in reverse.

After the backup shoe assembly is aligned in this manner, valve $V_1$, which is mounted on housing section 28 with valves $V_6$ and $V_7$ is manually operated to extend the in place clamp mechanism 20. By depressing valve $V_1$ its port 370 is placed in communication with the lines 371 and 372. The latter is in communication through the port 373 of valve $V_5$ with the air supply line 350. Valve $V_5$ is a control valve for the clamping mechanism 20 and is normally held in the position shown by its associated spring. In this manner air passes form the supply line 350 to the right side of the selector control valve 374 so that its port 376 is moved into position to provide communication between the lines 377 and 378. The latter is an extension of the air supply line 350 and thus air passes through the line 377 to the rams 188 to extend the rams and thereby rotate the torque tube 152 to extend the clamping members 22 of set in clamping mechanism 20.

Valve 374 is a detent type valve, as indicated schematically in the drawing, and is held in the position by the detent arrangement until the detent is released. The set in pipe 14 is now placed in position about housing section 28, as described above, with its end 18 adjacent the end 16 of the in place pipe 12. The operator then rotates the reach rod 52, by its handle 301, in a clockwise direction past neutral to operate the valve $V_2$. By operating valve $V_2$ its port 380 is placed in communication between the line 350 and the line 381 to supply air to the right of valve 382. This valve is also a detent valve and the application of air to its right side places its port 383 in communication between lines 384 and 385 where it is held until the detent is released. In this configuration, air from the supply line 350 passes through the line 386, pressure regulator 387, and check valve 388, to the line 385. At that point part of the air passes through port 383 to line 384 and thus to rams 210 to extend the rams while part of the pressure is passed through the port 389 of a valve 390. Thus, air is supplied to rams 210 at a low pressure to turn torque tube 154 until further movement is resisted by tension in the pipe upon engagement therewith by clamping members 22 of clamp mechanism 21. As a result, a low pressure is applied to the set in pipe 14 and it may then be manually aligned, if necessary, with the end of the pipe 12 and made "iron bound" therewith by abutting its end 18 against the end 16 of pipe 12 about the complete circumferential extent thereof.

After the pipe 14 is thus manually made "iron bound" with pipe 12, the operator moves the reach rod further to the right, as illustrated in FIG. 17, to operate valve $V_3$. By operating this valve, port 391 thereof is placed in communication with the air supply line 350 to provide air through line 392 to the right side of valve 390. As a result, the port 393 thereof is placed in communication with the line 385 so that increased pressure of the air supplied in line 350 is provided through port 383 and valve 382 to the rams 210 to further extend the rams against the tension in the pipe until this increased pressure is balanced by the increased tension in the pipe. Actuation of valve $V_3$ simultaneously provides air to the right side of a valve 395. However, that valve is provided on its right side with an air flow restrictor 396 and a check valve 397 which prevents air flow therethrough. After a predetermined period of time, sufficient to fully extend rams 210, a sufficient amount of air passes through restrictor 396 to urge valve 395 to the left and thereby place its port 398 in communication through lines 399 and 400 with the air supply line 350. In this manner air is supplied to the left side of the rams 50, as seen in FIG. 16, to retract the actuator rods 226 thereof and provide the gapping function previously described. It is thus seen that by the circuit of the present invention the clamping of the set in pipe and the spacing thereof is an automatic sequential operation.

As the piston rods 226 are retracted, the air if any, on the other side of the pistons is exhausted through the line 401 and port 402 of valve 395 to the exhaust line 403. However, the exhaust line 403 has an air flow restrictor 404 thereon so that all of the air is not immediately exhausted. The excess air is applied to the right side of the valve $V_4$ and causes the valve to move to the left, as seen in FIG. 16, so that its port 406 is placed in communication between the lines 407 and 408. Valve $V_4$, being a detent type valve, remains in this configuration until returned to the right as described hereinafter.

Line 407 is in direct communication with the supply line 350 and thus air is supplied from the air source through line 408 to valves 409 and 410. Valve 409 controls the operation of the rams 268 and 269 which rotate the first torque tube 34 to extend and retract the backup shoe assembly, while valve 410 operates the rams 286 which control the insertion of the wedge shaped backup shoe segments 288 between the shoes 246 of the backup assembly. Each of the valves 409 and 410 have flow restrictors 411, 412 respectively; however, the flow restrictor 411 permits air to flow therethrough at a faster rate than does the restrictor 412. As a result, the valve 409 is moved to the left before valve 410 and its port 413 is placed in communication between the lines 414 and 416. As a result, air flows directly from the air supply line 350 to the line 416 and rams 268 to extend the backup shoes 246. By the time the backup shoes 246 have been extended the restrictor 412 has permitted sufficient air to pass therethrough to move the valve 410 to the left in FIG. 17 so that its port 417 is placed in communication between the lines 419 and 420 so that air flows directly from line 350 to line 420 and rams 286 to extend the rams and insert the wedge-shaped backup shoe segments 288 in the spaces 250 between the backup shoes 246.

As thus far described, the pipe clamp has completed its function in preparation of the welding process and the welding process now may be completed with a continuous backup shoe assembly behind the spaced weld joint.

Upon the completion of the welding operation, the operator moves the reach rod control rod to the left past the neutral position to activate the valve $V_9$. By doing this the port 421 thereof is placed in communication with the line 350 and the line 422. As a result the valve $V_4$ is returned to its original configuration so that air supplied through line 407 is exhausted through its port 423. Accordingly, air is no longer supplied to the valves 409 and 410 and these valves are returned to the configuration illustrated in the drawing by the spring members secured to the left side thereof. However, before the valves 409 and 410 can be returned to their original configuration, the air on the right side thereof must be exhausted through the check valves and the resistors associated therewith. Since the valve 409 is provided with a check valve 420 which prevents the air from flowing therethrough, the air must flow through restrictor 411. On the other hand, the check valve of valve 410 permits the air on the right side of that valve to flow therethrough so that it may be exhausted through the line 408 and port 424 of valve $V_4$. Valve 410 thus moves to the right before valve 409, and thus is returned to the configuration illustrated in the drawing before valve 409, with its port 425 is placed back in communication with the line 419 so that air is supplied through that port to the rams 286 to retract the rams and thus retract the backup shoe segments 288. By the time the backup shoe segments have been retracted, the air to the right of valve 409 has completely passed through restrictor 411 and that valve returns to the right under the influence of its associated spring; thus air can flow from the supply line 350 through line 414 and port 426 in the valve to the ram 269 to extend that ram and rotate the torque tube 150 in reverse direction to retract the backup shoe assembly. Simultaneously, the rams 268 are exhausted through port 427 as the torque tube returns the rams to their original configuration.

Actuation of valve $V_9$ simultaneously provides air to a valve 428 which controls the actuation of the rams 210 and 211 in the set in clamp assembly 21. The supply of air through port 421 to the valve 428 passes through a restrictor 429 in the valve and this restrictor is dimensioned such that the full supply of air necessary to move the valve body 430 to the left against its spring bias passes through it only after the backup shoe assembly has fully retracted. When the valve body 430 is moved to the left its port 431 is connected to a line 432 which in turn is connected to lines 407, 386 and supply line 350 so that air passes directly through port 431 to the valves 382 and 389. Air pressure applied to the left of the latter two valves moves the valve bodies to the right and into the configuration illustrated in FIG. 16. As a result, port 433 of valve 389 is connected to line 407, and thus to the air supply line 350, so that air flows to the ram 211 to extend that ram and thereby rotate the torque tube 154 to retract the clamp members 22 in the set in clamp mechanism 21. Simultaneously, the valve body 382 is moved to the right against the bias of the detent at its right, so that the detent on the left of the valve body is connected to hold the body in the configuration in FIG. 16. As a result, the port 434 is connected to the rams 210 and permits the rear of the rams to be exhausted as they are retracted under the influence of ram 211 and the springs within their bodies.

Further, actuation of valve $V_9$ supplies air through line 422 to line 435, which air passes through a restrictor 436 connected to the left side of the valve 395. The restrictor 436 is dimensioned so that it passes a sufficient amount of air to the left side of the valve body 395 to move the valve to the right and into the position shown in FIG. 16 only after the clamping mechanism 21 has been retracted by the ram 211. The valve is then held in that position by a detent arrangement as schematically indicated in the drawing. As a result of this movement, port 437 of the valve is connected to the air supply line 350 through lines 400 and 386 so that air is supplied to the line 401 to extend rams 50 and thereby move the housing section 28 back towards the housing section 26 to close the gap previously made. Also, port 438 is connected to the line 399 so that the previously pressurized side of the rams 50 can be exhausted during extension thereof. Simultaneously air at the right of valve 395 is exhausted through check valve 397, line 392 and port 392' of valve $V_3$.

All of the equipment in the clamp 10 has now been deactivated except for the clamp mechanism 20 in the in place pipe 12. The weld formed can now be inspected to ascertain whether it is complete and satisfactory. If the weld is not satisfactory, valve $V_3$ can be actuated by turning reach rod 52 to the right so that the clamping mechanism 21 and backup shoe assembly are extended as above described in order that the welding process may be repeated or the weld repaired. If the weld is satisfactory, the operator then rotates reach rod 52 further to the left to activate valve $V_5$. The cam 310 associated with the valve $V_9$ has a configuration such that when valve $V_5$ is thus activated, valve $V_9$ is also activated so that the previously described mechanism remains retracted. Upon activation of valve $V_5$, the valve is moved upwardly, as seen in the drawings, so that port 440 is connected between the line 350 and the line 441 to supply air to the left of valve 374. This air operates against the detent arrangement mentioned above to move the valve to the right, into the configuration illustrated in FIG. 16, where it is held by another detent arrangement. In this position the port 442 of the valve is connected to the air supply line 350 so that air is supplied to the ram 200 to rotate the torque tube 152 in the direction to retract the clamp assembly 20. Simultaneously the port 443 of valve 374 is connected to the line 377 so that the air in the previously pressurized portions of rams 188 is exhausted and the rams are returned to their retracted position under the influence of ram 200 and the springs contained within the rams themselves. It is noted that the air previously at the right side of valve body 374 is exhausted through line 371 to permit the valve body 374 to move to the right.

The clamp assembly is now ready for movement through the pipeline to the next position and the operator may then activate valve $V_{12}$ as previously described to move the clamp mechanism through the pipeline to the next joint to be welded. It is noted however, that the previously mentioned valve $V_{11}$ provides an override control to this movement. This valve is operably connected to the clamps 22 of the clamp mechanisms 20 and 21 and when the clamps are extended, the valve is moved into position with its port 44 connected to the line 350, so that air cannot pass therethrough to valve $V_{10}$. Thus, in the event that the clamps 22 have not been retracted, the air required to drive motors 66 in the forward direction is not supplied thereto and the apparatus then cannot be moved. Accordingly, damage to the clamping mechanisms and the entire clamp assembly is avoided. On the other hand, if the clamps have been properly retracted, the valve $V_{11}$ will be in the position illustrated in FIG. 16 so that air can pass from the supply line through the valve $V_{10}$ which is in its raised position with port 358 connected between lines 359 and 360 so that air is supplied to the motor 66 as described above.

An additional valve $V_8$ is provided as an alternative safety override to stop the clamp assembly 10 as it moves down the pipeline in the event for some reason valve $V_{10}$ should fail to operate. This valve is mounted, as seen in FIG. 2a, at the forward end of the clamp assembly on the web 56. Its actuator 445 is pivotally mounted on the valve body and has a roller 446 engaged with a cam surface 447 on the actuator rod. The actuator rod 52 is slidably mounted in the collar 54 for axial movement with respect thereto and is urged outwardly to the left of the assembly by spring 448. In the event that the operator determines that it is necessary to stop the movement of the clamp assembly as it passes through the pipeline, he merely pushes forward on the reach rod so as to move the rod towards the right in FIG. 2a so that the valve actuator 446 rides up the cam surface 447. As a result, the valve body $V_8$, as seen in FIG. 16, moves upwardly to connect its port 450 with the air supply line 350. The air then passes through the valve body to the right of valve 353 to move that valve to the left in the drawing and connect its port 451 with exhaust. As a result, the air supplied through valve $V_{11}$ and valve $V_{10}$ is exhausted to the atmosphere and no air is supplied to the motor 66, so that these motors stop and the device coasts to a stop.

While a completely pneumatic system has been described herein it is contemplated that a similar hydraulic system may be utilized in lieu thereof, particularly where greater forces are required with extremely large diameter pipes having large wall thicknesses.

Accordingly, it is seen that a relatively simple and compact device is provided for clamping two pipes in a pipeline assembly and providing a weld joint backup shoe assembly for supporting molten weld metal during the welding operation. The apparatus is provided with a drive mechanism for moving the clamp through the pipeline to provide a continuous welding operation and is provided with a number of safety devices for stopping and starting movement of the clamp assembly through the pipeline.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A pipe clamp for aligning and spacing a pair of pipes to be welded comprising, a housing having first and second housing sections positioned in axial alignment and having adjacent end portions positioned for relative axial movement with respect to each other, said housing being adapted for disposition within and coaxially of the pipes to be welded with the adjacent end portions thereof located adjacent the inside of the joint between the adjacent ends of the pipes to be welded, a plurality of clamping members slidably mounted in each of said housing sections for radial movement between extended and retracted positions with respect to their associated housing sections, means for selectively extending and retracting said clamping members into and out of clamping engagement with a surrounding pipe, means for moving said first housing section and the clamping members mounted thereon a predetermined distance with respect to said second housing section after said clamping members are extended whereby a pipe clampingly engaged with the clamping members on said first housing section is moved said predetermined distance with respect to a pipe clampingly engaged with the clamping members on said second housing section and said adjacent pipe ends are spaced said predetermined distance; a weld joint backup shoe assembly slidably mounted in said second housing section for radial movement with respect thereto between extended and retracted positions and located between the clamping members on said first and second housing sections, and means for selectively extending and retracting said weld joint backup shoe assembly into and out of position adjacent the joint between the pipes to be welded, after said pipes have been spaced.

2. The pipe clamp as defined in claim 1 including means for driving said pipe clamp through a pipe in which it is inserted to move the pipe clamp from a completed weld joint at one end of the pipe to the free end thereof in position for the next joint to be welded and means for automatically stopping said driving means as the backup shoe assembly in said second housing approaches said free end.

3. The pipe clamp as defined in claim 2 including means for sensing the presence of a surrounding pipe and said automatic stopping means includes means responsive to said sensing means for stopping said driving means when no pipe is sensed, said sensing means being located at a predetermined distance from said backup shoe assembly in the direction of movement of said pipe clamp.

4. The pipe clamp as defined in claim 1 wherein said means for extending and retracting said clamping members includes means for first extending said clamping members in said first housing section, first with a relatively light pressure to extend said clamping members from a retracted position to an intermediate position wherein said light pressure is resisted by a surrounding pipe to prevent further extension of said clamping members under said light pressure whereby said clamping members apply a relatively light pressure to said surrounding pipe to permit said surrounding pipe to be adjusted on said clamp members and positioned with its end in abutting relation to the end of an adjacent pipe surrounding said second housing section and then with an increased pressure to said clamping members in said first housing section to move said clamping members from said intermediate position to a further extended position for firmly clamping the surrounding pipe in position.

5. The pipe clamp as defined in claim 1 wherein said weld joint backup shoe assembly includes four arcuate weld joint backup shoes each defining a substantially 90° backup shoe sector with each sector having its respective end portions adjacent the end portions of adjacent sectors in the retracted position of said assembly, a backup shoe segment associated with the ends of each of said sectors and dimensioned to fit between the ends of said sectors after said assembly is extended, and means for moving said segments transversely of said shoe sections into position between the ends of said sectors after the assembly is extended.

6. A pipe clamp for aligning and spacing a pair of pipes to be welded comprising, a housing having first and second sections, operatively interconnected for relative axial movement therebetween, for disposition within and coaxially of the pipes to be welded with the point of operative interconnection between said sections adjacent the inside of the joint between the adjacent ends of the pipes to be welded, an elongated support member mounted in said housing with one end thereof mounted in said first housing section for sliding movement therebetween and the other end thereof rigidly mounted in said second housing section, a first torque tube receiving said support member and being rotatably mounted thereon, a pair of second torque tubes respectively receiving and being rotatably mounted on said first torque tube, with the opposed ends thereof being spaced from one another and located respectively in said first and second housing sections; a pair of annular radially extending cams mounted respectively on said second torque tubes adjacent the opposed ends thereof, a plurality of clamping members associated with said cams and slidably mounted in each of said housing sections for radial movement between extended and retracted positions with respect to said housing sections and positioned in concentric alignment with their associated cam, said clamping members each including a cam follower and means for maintaining the cam followers in engagement with their associated cams, said cams having lobes on the peripheral surface thereof for extending said clamping members when said lobes are engaged with said cam followers; and means for rotating said second torque tubes between first and second positions corresponding to the retracted and extended positions of said clamping members whereby said lobes are in engagement with said cam followers at the second position of said second torque tubes to extend said clamping members into engagement with the inside surfaces of said pipes on opposite sides of said joint; an annular radially extending cam mounted on said first torque tube between the opposed ends of said second torque tubes, a weld joint backup shoe assembly slidably mounted in said second housing section for radial movement with respect thereto between extended and retracted positions, and positioned in concentric alignment with the cam mounted on said first torque tube, said assembly including a plurality of cam followers and means for maintaining said cam followers in engagement with their associated cam, said cam on said first torque tube having a lobe on its periphery associated with each of said cam followers for moving said assembly to its extended position; and means for rotating said first torque tube between first and second positions corresponding respectively to retracted and extended positions of said backup shoe assembly whereby the lobes on said last mentioned cam are moved into engagement with their associated cam followers at the second position of said first torque tube to extend said backup shoe assembly against said joint; and means for slidingly moving said first housing section and said second torque tube in said first housing section along said first torque tube a predetermined distance with respect to said second housing section, prior to the extension of said backup shoe assembly and after extension of said clamping members, whereby said adjacent ends of said pipe are spaced apart said predetermined distance.

7. The pipe clamp as defined in claim 6 wherein said means for moving said first housing section comprises a plurality of ram members operably connected between said support member and both said first housing section and said second torque tube, and stop means mounted on said support member and spaced said predetermined distance from said second torque tube to limit movement of said second torque tube and said housing with respect to said support member.

8. The pipe clamp as defined in claim 7 including means for driving said pipe clamp through a pipe in which it is inserted and fro moving the clamp from a completed welded joint at one end of a pipe to the free end thereof.

9. The pipe clamp as defined in claim 8 including means for automatically stopping said driving means at the point of interconnection of said first and second housing sections for approaches said free end.

10. The pipe clamp as defined in claim 9 wherein said automatic stopping means comprises means for selectively controlling the operative and inoperative modes of said drive means and means, forwardly of the point of operative interconnection between said housing sections with respect to the direction of travel of said clamp, for sensing the presence or absence of a surrounding pipe, said controlling means being responsive to said sensing means to place said driving means in its inoperative mode when no pipe is present.

11. The pipe clamp as defined in claim 10 wherein said sensing means is located at a predetermined distance from said point of operative interconnection between said housing sections selected such that as said clamp is moved through a pipeline said sensing means causes the drive means to become inoperative as the sensing means passes the free end of the pipeline.

12. The pipe clamp as defined in claim 11 wherein said drive means includes at least one motor and at least one drive wheel driven from said motor located to engage the inner surface of a surrounding pipe and said sensing means comprises means, spring biased outwardly of said housing, for engaging the inner surface of a surrounding pipe.

13. A pipe clamp as defined in claim 12 including a pair of drive wheels located on diametrically opposed sides of said housing, one of said drive wheels being pivotally mounted on said housing and spring biased outwardly, to insure engagement of said one drive wheel with the inner surface of a surrounding pipe.

14. A pipe clamp as defined in claim 6 wherein said means for rotating said first torque tube comprises a plurality of rams mounted on said housing and operatively connected to said first torque tube.

15. The pipe clamp as defined in claim 14 wherein said rams are single acting and a plurality of said rams are positioned to rotate said first torque tube from its first to its second position to extend said backup shoe assembly and at least one ram is positioned to rotate said first torque tube from its second to its first position whereby said backup shoe assembly is retracted as said cam followers of said assembly move into the recesses between the lobes on their associated cam, under the influence of said means for maintaining the cam followers in engagement with the cam.

16. The pipe clamp as defined in claim 15 including means, adjacent the cam associated with said backup shoe assembly and secured to said first torque tube, defining a track corresponding substantially to the configuration of adjacent cam lobes, and track follower means operably connected to said backup shoe assembly and positioned in said track whereby said backup shoe assembly is returned to its retracted position by the positive application of force thereto from said at least one ram through said track and track follower means.

17. The pipe clamp as defined in claim 6 wherein said means for rotating said second torque tubes comprises first and second sets of rams mounted respectively in each of said housing sections and operatively connected to the second torque tube in their associated housing section.

18. The pipe clamp as defined in claim 17 wherein each of said rams is single acting and each of said sets of rams comprises a plurality of rams positioned to rotate their associated torque tube from its first to its second position to extend said clamps and at least one positioned to rotate its associated second torque tube from its second to its first position whereby said clamps are retracted as said clamp member cam followers move into the recesses between the lobes on their associated cams under the influence of said means for maintaining the cam followers in engagement with the cam.

19. The pipe clamp as defined in claim 18 including control means operatively connected to the plurality of rams in the set associated with said first housing section for controlling said last mentioned rams to rotate their associated second torque tube first with a relatively light pressure from said first position thereof to an intermediate position wherein said light pressure is resisted by a surrounding pipe to prevent further extension of said clamp members under said light pressure whereby said clamp members apply a relatively light pressure to said surrounding pipe to permit said surrounding pipe to be adjusted on said clamp members and positioned with its end in abutting relation to an adjacent pipe and then with an increased pressure to rotate said second torque tubes from said intermediate position to its second position for firmly clamping the surrounding pipe in position.

20. The pipe clamp as defined in claim 6 wherein said weld joint backup shoe assembly includes four arcuate weld joint backup shoes each defining a substantially 90° backup shoe sector with each sector having its respective end portions adjacent the end portions of adjacent sectors in the retracted position of said assembly, a backup shoe segment associated with the ends of each of said sectors and dimensioned to fit between the ends of said sectors after said assembly is extended, and means for moving said segments into position between said ends of said sectors after the assembly is extended.

21. The pipe clamp as defined in claim 20 wherein said segments are mounted in said assembly to move radially outwardly with said sectors during extension of said assembly and said means for moving said segments is positioned to move said segments into position between the ends of said sectors along paths substantially parallel to the longitudinal axis of said first torque tube.

22. The pipe clamp as defined in claim 21 wherein said segments are generally wedge shaped and the ends of said sectors are beveled to diverge from one another to receive said segments therebetween.

23. The pipe clamp as defined in claim 22 wherein said sectors and segments are formed of steel and have copper inserts therein located in a position to bridge said space between said pipe ends in the extended configuration of said assembly to dissipate heat from the welding process during the welding of said joint.

24. A device for axially aligning and clamping the juxtaposed ends of two pipeline sections comprising a housing for disposition in and coaxially of the pipes to be welded, a first set of clamping members slidably mounted in said housing for radial movement between extended and retracted positions with respect to said housing and positioned for engagement with the inner surface on one of said pipe ends, a second set of clamping members slidably mounted in said housing, in spaced relation to said first set, for radial movement between extended and retracted positions with respect to said housing and positioned for engagement with the inner surface of the other of said pipe ends, a pair of annular cams rotatably mounted in said housing in axial alignment therewith and being respectively positioned in concentric alignment with one of said sets of clamping members, said cams each having a plurality of cam lobes and recesses on the peripheral surface thereof, cam follower means operatively interconnecting said clamp members and said cams, means for maintaining said cam followers in engagement with their associated cams and means for selectively rotating said cams between first and second positions corresponding respectively to the retracted and extended positions of said clamping members wherein said cam followers are respectively engaged with said cam recesses and cam lobes whereby said clamp members are selectively located in their retracted or their extended positions for clamping engagement with surrounding pipe ends.

25. The device for axially aligning and clamping the juxtaposed ends of two pipeline sections as defined in claim 24 wherein an individual cam follower is operatively connected between each of said clamping members and said cams, and the number of lobes and recesses on said cams correspond respectively to the number of clamping members in its associated set.

26. The device for axially aligning and clamping the juxtaposed ends of two pipeline sections as defined in claim 25 wherein said means for rotating said cams comprises independent drive means for separately rotating each of said cams and wherein the drive means for rotating one of said cams includes means controlling rotation of said one cam for movement by its drive means initially with a relatively light pressure from the retracted position of its associated clamping members to an intermediate position wherein said light pressure is resisted by a surrounding pipe to prevent further extension of said clamping members under said light pressure whereby its associated set of clamping members applies a relatively light pressure to said surrounding pipe to permit said surrounding pipe to be adjusted on said clamp members and positioned with its end in abutting relation to the juxtaposed end of an adjacent pipe and then with an increased pressure to said one cam from said intermediate position to a final position corresponding to the fully extended position of said associated set of clamping members for firmly clamping the surrounding pipe in juxtaposed abutting position with the adjacent pipe.

27. The device as defined in claim 26 including first and second torque tubes coaxially and rotatably mounted in spaced relation in said housing and coaxial therewith, said cam members being respectively rigidly mounted on said torque tubes and said drive means for separately rotating said cam members being operatively connected to said torque tubes for separately rotating said torque tubes, whereby said cams are rotated.

28. The device as defined in claim 26 wherein said housing includes first and second housing sections positioned in axial alignment and having adjacent end portions positioned for relative axial movement with respect to each other, said first and second sets of clamping members being mounted respectively in said first and second housing sections with said adjacent housing end portions therebetween, and means for moving one of said housing sections and the clamping members thereon a predetermined distance with respect to the other of said housing sections, after both of said sets of clamp members are fully extended, whereby a pipe clampingly engaged with the clamping members on said one housing is moved said predetermined distance with respect to a pipe clampingly engaged with the clamping members on the other of said housing sections and said abutting juxtaposed pipe ends are spaced said predetermined distance.

29. The device as defined in claim 28 including a central axially extending tubular support member in said housing with one end thereof mounted in said one housing section for sliding movement therebetween and the other end thereof rigidly mounted in the other of said housing sections, said torque tubes receiving and being rotatably and slidably mounted on said support member and said means for moving said one housing section comprises at least one ram operably connected between said support member and said one housing section and stop means mounted on said support member said predetermined distance from said end of one of said torque tubes, in the direction of travel of said one housing section, to limit movement of said torque tube and said one housing section with respect to said support member and said other housing section to said predetermined distance.

30. The device as defined in claim 27 wherein said drive means each includes a plurality of single acting rams mounted on said housing and operatively connected to its associated torque tube for rotating said tubes and its cam from said first to said second position thereof to extend said clamp members and at least one of said rams being positioned to rotate its associated torque tube from its second to its first position whereby said clamps are retracted as said cam followers move into the recesses between the lobes on their associated cam under the influence of said means for maintaining the cam followers in engagement with the cams.

31. The device as defined in claim 25 wherein said cam lobes include a flat planar inclined surface engaged with said cam followers in the extended positions of said clamping members to provide a constant radial thrust to said clamping members.

32. Apparatus for providing a backing support for molten weld metal introduced between the juxtaposed ends of two pipeline sections comprising, a housing for disposition in and coaxially of the pipes to be welded, a weld joint backup shoe assembly slidably mounted in said housing for radial movement with respect thereto between extended and retracted positions, an annular cam rotatably mounted in said housing in concentric alignment with said backup shoe assembly, said cam having a plurality of lobes and recesses on the peripheral surface thereof, cam follower means operatively interconnecting said backup shoe assembly and said cam, means for maintaining said cam follower means in engagement with said cam, and means for selectively rotating said cam between first and second positions corresponding respectively to the retracted and extended positions of said backup shoe assembly whereby said cam follower means are moved from engagement with said cam recesses into engagement with said lobes to extend said assembly and place it in rigid circumferential contact with the inner surfaces of the pipeline ends to be welded.

33. The apparatus as defined in claim 32 wherein the backup shoe assembly includes two arcuate weld joint backup shoes having their respective end portions adjacent the end portions of adjacent sectors in the retracted position of said assembly, a plurality of backup shoe segments associated respectively with the ends of each of said shoes and each segment being dimensioned to fit between the ends of its adjacent pair of backup shoes, and means for moving said segment into position between the ends of said shoes after said assembly is extended.

34. The apparatus as defined in claim 33 wherein said segments are mounted in said assembly to move radially outwardly with said shoes during extension of said assembly and said means for moving said segments is positioned to move said segments into position between the ends of said shoes along paths substantially parallel to the axis of rotation of said cams.

35. The apparatus as defined in claim 34 wherein there are four backup shoes, with each shoe defining a substantially 90° sector of said assembly in the retracted position thereof.

36. The apparatus as defined in claim 35 wherein said segments are generally wedge shaped and the ends of said shoes are beveled to diverge from one another to receive said segments therebetween.

37. The apparatus as defined in claim 36 including individual yoke members operably interconnecting each of the adjacent ends of said backup shoe sectors and permitting relative circumferential movement therebetween during extension and retraction of said assembly, each of said yoke members including a stem portion slidably mounted in said housing and one of said cam followers being operably connected to each of said stem portions for engagement with said cam.

38. The apparatus as defined in claim 37 wherein said segments and means for moving said segments are mounted on said yokes for movement therewith.

39. The apparatus as defined in claim 32 including means adjacent said cam and mounted for rotation therewith defining a track corresponding substantially to the configuration of adjacent cam lobes, and track follower means operably connected to said backup shoe assembly and positioned in said track, whereby said backup shoe assembly is returned to its retracted position by the positive application of force thereto from said means to rotate said cam through the engagement of said track and track follower means.

40. The apparatus as defined in claim 32 including a torque tube coaxially and rotatably mounted in said housing, said cam being rigidly mounted on said torque tube and said means for rotating said cam being operatively connected to said torque tube for rotating said torque tube and said cam.

41. The apparatus as defined in claim 40 wherein said rotating means includes a plurality of single acting rams mounted in said housing for rotating said tube and said cam from said first to said second positions to extend said assembly and at least one single acting ram mounted in said housing to rotate said tube and cam from said second to said first position to retract said assembly.

42. The apparatus as defined in claim 32 including means for driving the apparatus through a pipe in which it is inserted to move the apparatus from a completed weld joint at one end of the pipe to the free end thereof in position for the next joint to be welded and means for automatically stopping said driving means as said backup shoe assembly approaches said free end.

43. The apparatus as defined in claim 42 including means for sensing the presence of a surrounding pipe and means responsive to said sensing means for stopping said driving means when no pipe is sensed, said sensing means being located at a predetermined distance from said backup shoe assembly in the direction of movement of said apparatus, said distance being selected such that as said sensing means passes the free end of the pipe, the driving means is stopped.

44. A weld joint backup shoe assembly providing backup support for molten weld metal introduced between the juxtaposed ends of two pipeline sections, said assembly including at least two arcuate weld joint backup shoes mounted in said assembly for radial movement between retracted and extended positions and having their respective end portions adjacent the end portions of adjacent shoes in the retracted position of the assembly, means for extending said shoes in engagement with the inside of said juxtaposed pipeline ends and for retracting said shoes, a plurality of backup shoe segments respectively associated with the ends of each of said backup shoes and each segment being dimensioned to fit between the end of its adjacent pair of backup shoes after said assembly is extended, and means for moving said segments transversely of said backup shoes into position between the ends of said shoes after said shoes are extended.

45. The assembly as defined in claim 44 wherein said segments are mounted in said assembly to move radially outwardly with said shoes during extension of said assembly and said means for laterally moving said segments is positioned to move said segments into position between the ends of said shoes along paths substantially perpendicular to the radial movement of said shoes whereby said segments are positioned between said shoes with their outer surfaces in substantial alignment with the outer surfaces of adjacent shoes and in contact with the inner surfaces of adjacent pipes.

46. The assembly as defined in claim 45 wherein there are four backup shoes with each shoe defining a substantially 90° sector of said assembly in the retracted position thereof.

47. The assembly as defined in claim 46 wherein said segments are generally wedge-shaped and the ends of said shoes are beveled to diverge from one another to receive said segments therebetween.

48. The assembly as defined in claim 47 including individual yoke members operably interconnecting each of the adjacent ends of said backup shoe sectors and permitting relative circumferential movement therebetween during extension and retraction of said assembly, said yoke members being operatively interconnected with said means for extending and retracting said shoes and having said segments and said means for moving said segments mounted thereon for radial movement therewith.

49. The assembly as defined in claim 48 wherein said sector and segments are formed of steel and have copper inserts therein located in position to bridge a space between said juxtaposed pipe ends in the extended configuration of said assembly to dissipate heat from the welding process during the welding of said joint.

50. The device as defined in claim 24 wherein said housing includes first and second housing sections positioned in axial alignment and having adjacent end portions positioned for relative axial movement with respect to each other, said first and second sets of clamping members being mounted respectively in said first and second housing sections with said adjacent housing end portions therebetween, and means for moving one of said housing sections and the clamping members thereon a predetermined distance with respect to the other of said housing sections, after both of said sets of clamp members are fully extended, whereby a pipe clampingly engaged with the clamping members on said one housing is moved said predetermined distance with respect to a pipe clampingly engaged with the clamping members on said one housing is moved said predetermined distance with respect to a pipe clampingly engaged with the clamping members on the other of said housing sections and said abutting juxtaposed pipe ends are spaced said predetermined distance.

51. The pipe clamp as defined in claim 7 wherein said ram members comprise pneumatic rams.

52. The pipe clamp as defined in claim 14 wherein said rams comprise pneumatic rams.

53. The pipe clamp as defined in claim 17 wherein said rams comprise pneumatic rams.

54. The device as defined in claim 30 wherein said rams comprise pneumatic rams.

55. The apparatus as defined in claim 41 wherein said rams comprise pneumatic rams.

* * * * *